(12) United States Patent
Mitamura

(10) Patent No.: US 8,393,614 B2
(45) Date of Patent: Mar. 12, 2013

(54) SHEET FEEDING APPARATUS AND IMAGE READING APPARATUS

(75) Inventor: Akiyuki Mitamura, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/872,343

(22) Filed: Aug. 31, 2010

(65) Prior Publication Data

US 2011/0058881 A1 Mar. 10, 2011

(30) Foreign Application Priority Data

Sep. 7, 2009 (JP) ................................. 2009-205686

(51) Int. Cl.
*B65H 1/18* (2006.01)
(52) U.S. Cl. ........ 271/152; 271/147; 271/162; 271/155; 271/110
(58) Field of Classification Search ................... 271/110, 271/121, 122, 123, 124, 126, 145, 147, 152, 271/153, 154, 155, 156, 157, 160, 162, 167
See application file for complete search history.

(56) References Cited

U.S. PATENT DOCUMENTS

| | | | | |
|---|---|---|---|---|
| 3,957,366 A | | 5/1976 | Taylor et al. | |
| 4,925,177 A | * | 5/1990 | Nakamura et al. | 271/110 |
| 4,952,177 A | | 8/1990 | Drake et al. | |
| 5,527,029 A | * | 6/1996 | Bortolotti et al. | 271/124 |
| 5,887,867 A | | 3/1999 | Takahashi et al. | |
| 5,992,993 A | * | 11/1999 | Kiyohara et al. | 347/104 |
| 6,199,855 B1 | * | 3/2001 | Choeng et al. | 271/122 |
| 6,485,015 B2 | * | 11/2002 | Yen et al. | 271/121 |
| 6,877,738 B2 | * | 4/2005 | Sonoda et al. | 271/121 |
| 7,100,914 B2 | * | 9/2006 | Ramos | 271/121 |
| 7,104,539 B2 | * | 9/2006 | Shimoyama | 271/167 |
| 7,484,724 B2 | * | 2/2009 | Yamanaka et al. | 271/121 |
| 7,503,559 B2 | | 3/2009 | Yoshida | |
| 7,624,979 B2 | * | 12/2009 | Masutani | 271/167 |
| 7,731,177 B2 | * | 6/2010 | Ikeda | 271/121 |
| 7,753,355 B2 | | 7/2010 | Mitamura | |
| 7,980,551 B2 | * | 7/2011 | Kobayashi | 271/121 |

(Continued)

FOREIGN PATENT DOCUMENTS

| | | |
|---|---|---|
| CN | 1385316 A | 12/2002 |
| CN | 1885182 A | 12/2006 |

(Continued)

OTHER PUBLICATIONS

Office Action dated Oct. 26, 2012, in Korean Application No. 10-2010-0086895.

(Continued)

*Primary Examiner* — Kaitlin Joerger
*Assistant Examiner* — Ernesto Suarez
(74) *Attorney, Agent, or Firm* — Fitzpatrick, Cella, Harper & Scinto

(57) ABSTRACT

In a sheet feeding apparatus, an image reading apparatus and an image forming apparatus, an original document tray on which sheets are accommodated along the sheet feeding direction includes a placing plate on which the sheets are placed and which can be lifted and lowered and to move the sheets to a position at which the sheets can be fed by a pickup roller, a detection unit which detects that sheets are placed on the placing plate, and a curl suppressing member which presses a central portion in a width direction perpendicular to the sheet feeding direction of the accommodated sheets to suppress upward curl of downstream edges in the sheet feeding direction of the sheets.

11 Claims, 18 Drawing Sheets

U.S. PATENT DOCUMENTS

| | | |
|---|---|---|
| 8,096,547 B1 * | 1/2012 | Huang et al. ............... 271/117 |
| 2002/0175462 A1 | 11/2002 | Sonoda et al. |
| 2006/0285904 A1 | 12/2006 | Yoshida |

FOREIGN PATENT DOCUMENTS

| | | |
|---|---|---|
| EP | 1256534 A2 | 11/2002 |
| EP | 1256534 A3 | 3/2004 |
| EP | 1256534 B1 | 10/2007 |
| JP | 2005-277533 | 10/2005 |
| JP | 2009-035395 | 2/2009 |
| JP | 4907460 B2 | 3/2012 |
| KR | 2002-0086257 A | 11/2002 |

OTHER PUBLICATIONS

Notification of First Office Action, dated Dec. 10, 2012, issued by The State Intellectual Property Office of P.R. China, issued in Chinese Patent Application No. 201010277625.4.

* cited by examiner

SHEET FEEDING APPARATUS AND IMAGE READING APPARATUS

BACKGROUND OF THE INVENTION

1. Field of the Invention

The present invention relates to a sheet feeding apparatus and an image reading apparatus, and more specifically to a curl suppressing member which suppresses curl in the sheets.

2. Description of the Related Art

An image reading apparatus which reads an image on an original document includes a sheet feeding apparatus for feeding sheets such as recording materials or original documents separately one by one to an image reading unit. A conventional sheet feeding apparatus feeds sheets set on a sheet tray one by one by means of a pickup roller.

In the related art, an apparatus is discussed having a structure in which a detection sensor detects that sheets are placed on a sheet tray, the detection sensor being at a downstream end side in the sheet feeding direction of the sheet tray (at a leading edge side of the placed sheets) (see Japanese Patent Application Laid-Open No. 2005-277533).

In such a sheet feeding apparatus of the related art, however, the detection sensor cannot detect that sheets are placed on the sheet tray if the leading edges of the sheets curl upward, for example. Accordingly, since the detection sensor does not detect the sheets although the sheets are indeed present, the sheet feeding apparatus incorrectly determines that the sheets are not placed on the sheet tray. Therefore, feeding of the sheets does not start. In particular, when a small number of sheets are placed and if the leading edges of the sheets curl upward, the leading edges of the placed sheets are not in contact with the upper surface of the sheet tray, and thus the detection sensor does not detect the sheets.

In view of the aforementioned circumstances, the present invention is directed to a sheet feeding apparatus and an image reading apparatus capable of detecting more accurately that the sheets are in place.

SUMMARY OF THE INVENTION

It is desirable to provide an image forming apparatus which can detect more accurately that the sheets are in place.

The present invention relates to a sheet feeding apparatus comprising: a placing member having a placing surface along which a sheet may be inserted and on which the sheet may be placed; a sheet feeding unit configured to feed the sheet placed on the placing surface in a sheet feeding direction; a detection unit which is arranged at a downstream end portion of the placing surface in the sheet feeding direction and is configured to detect a sheet; and a pressing member which is arranged in an inclined manner so as to be closer to the placing surface at downstream side in the sheet feeding direction than an upstream side and which is adapted to guide a downstream edge in the sheet feeding direction of the sheet inserted in the sheet feeding direction along the placing surface toward the detection unit and to press the downstream edge in the sheet feeding direction of the sheet toward the placing surface.

Further features of the present invention will become apparent from the following description of exemplary embodiments with reference to the attached drawings.

DESCRIPTION OF THE EMBODIMENTS

Figure 1:
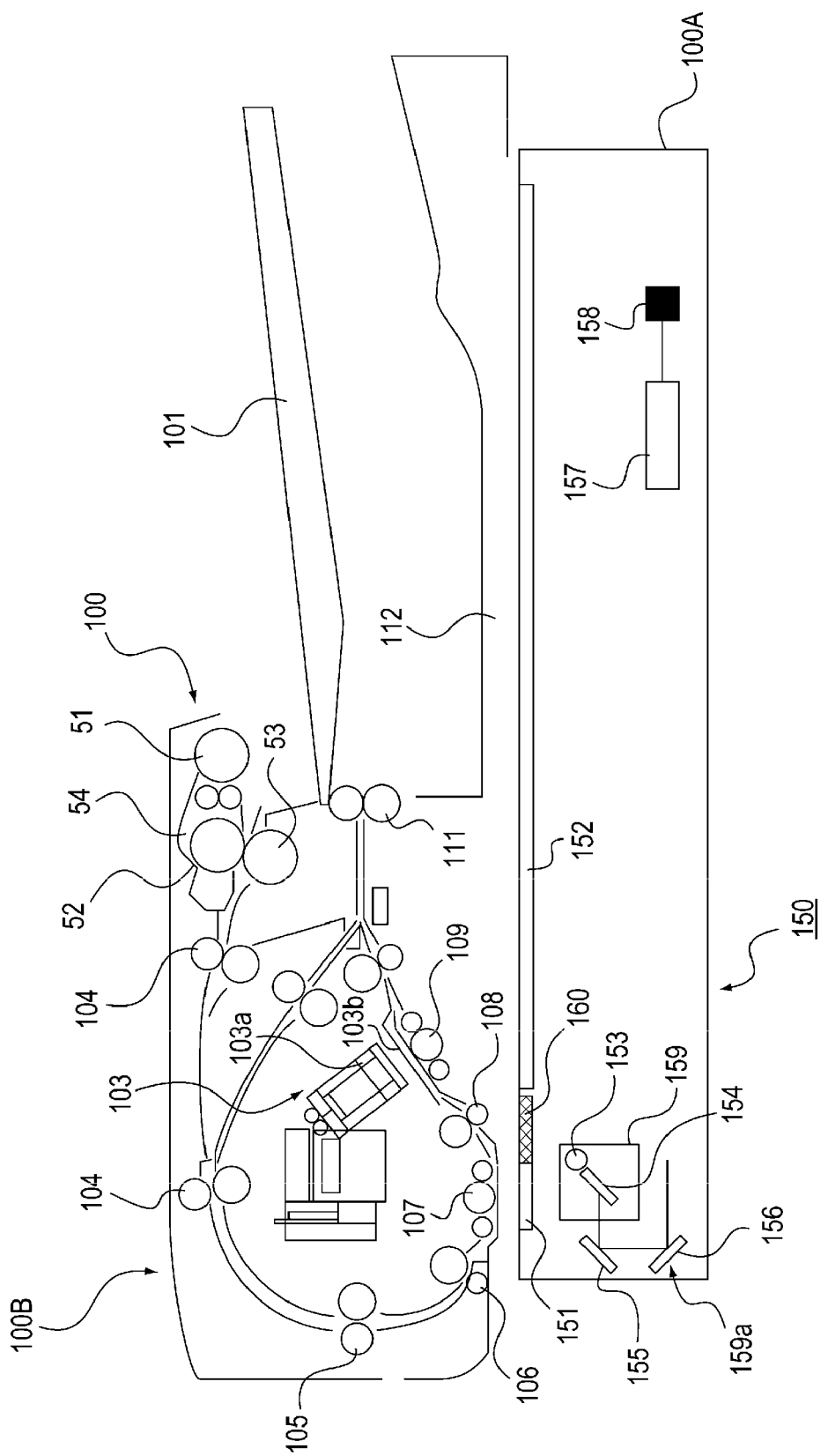
FIG. 1 is an illustration of a structure of an image reading apparatus including a sheet feeding apparatus according to a first embodiment of the present invention.

In the following, embodiments of the present invention will be described with reference to the drawings. FIG. 1 is an illustration of a structure of an image reading apparatus including a sheet feeding apparatus according to a first embodiment of the present invention. In FIG. 1, an image reading apparatus 100 includes an image reading apparatus main body 100A. The image reading apparatus main body 100A includes a first image reading unit 150 which reads an image on a front surface (first face) of an original document, which may be a sheet. The image reading apparatus 100 also includes an automatic document feeder (ADF) 100B. The automatic document feeder 100B is a sheet feeding apparatus which feeds an original document, such as a sheet, and includes a second image reading unit 103 which reads an image on a rear surface (second face) of an original document.

The first image reading unit 150 includes a transparent surface glass member 151 on which an original document conveyed by the automatic document feeder 100B passes during in-flow reading of the document, and a white reading roller 107 arranged to face a reading position. What is meant by "in-flow" reading is that the document to be read is provided to the sheet-feeding apparatus 100 in such a way that it is fed past the sheet-reading units, rather than being placed, for example, face-down on a platen above a sheet-reading unit, and having to be placed and removed by hand. The first image reading unit 150 also includes a first mirror unit 159 which includes a lamp 153 and a mirror 154 and which irradiates an original document passing on the surface glass member 151 with light to enable the reading of the original document image. The first image reading unit 150 also includes a second mirror unit 159a which includes two mirrors 155 and 156. The first image reading unit 150 also includes a lens 157 and a CCD (charge-coupled device sensor) 158. The first image reading unit 150 irradiates a front surface of an original document passing on the surface glass member 150 with light from the lamp 153 and the light reflected by the original document is guided to the lens 157 via the mirrors 154 to 156. The lens 157 forms an image of the original document at a light receiving unit of the CCD 158.

A glass (or similar) base plate 152 is arranged on an upper surface of the image reading apparatus main body 100A. In "fixed" reading in which an original document image is placed on the base plate 152, the original document image is read while moving the first and second mirror units 159 and 159a. The original document is set on the glass base plate by the automatic document feeder 100B or manually. In fixed reading (as opposed to "in-flow" reading), after the original document is set on the original base plate glass, the first and second mirror units 159 and 159a are moved in a direction parallel to the original base plate glass 152 while irradiating a lower surface of the original document with the lamp 153 by rotary drive of a drive motor (not illustrated). A white reference member 160 which is a white reference for the first image reading unit 150 is arranged between the base plate glass 152 and the surface glass member 151. The first image reading unit 150 reads the surface of the white reference member 160 to generate white-level reference data, and detects a change in shade of image signals relative to the generated reference data.

The second image reading unit 103 which reads an image on a rear surface of an original document includes a contact image sensor 103a which is an image reading unit integrally constituting a lamp, a lens, and a CCD (which are not illustrated). The second image reading unit 103 also includes a rear surface glass 103b, and a white rear surface reading roller 109 arranged to face the contact image sensor 103a at a reading position of the contact image sensor 103a.

The automatic document feeder 100B is adapted to convey original documents (not illustrated) stacked on (i.e. held in) an original document accommodating unit 101, which is a sheet accommodating unit, to the first image reading unit 150 and the second image reading unit 103 during in-flow reading, and includes a pickup roller 51 which is arranged above the original document accommodating unit 101 and which is adapted to feed out an original document from the original document accommodating unit 101. The pickup roller 51, which acts as a sheet feeding unit, is rotatably held on a pivoting end of an arm 54 which is itself vertically pivotable toward and away from the original document accommodating unit 101. The pickup roller 51 is usually retracted to an upper position, which is a home position, by upward turning of the arm 54 so as not to interfere with the operation of setting an original document. When a sheet feeding operation is started, the pickup roller 51 lowers by downward turning of the arm 54 and abuts an upper surface of an original document in the original document accommodating unit 101.

A pair of separating rollers 52, 53 is arranged downstream of the pickup roller 51. "Downstream" is used with reference to the feeding direction of the original document that is fed from the original document accommodating unit 101. The pair of separating rollers 52, 53 constitutes a conveying roller 52 and a separating roller 53 and is adapted to separate original documents one by one. In addition, two pairs of conveying rollers 104 and a pair of registration rollers 105 are arranged downstream of the pair of separating rollers 52, 53. The pairs of conveying rollers 104 convey an original document separated one by one by the pair of separating rollers 52, 53, and the pair of registration rollers 105 aligns the leading edge of the original document conveyed by the pairs of conveying rollers 104. The leading edge of the original document is aligned by causing the leading edge of the original document conveyed by the pairs of conveying rollers 104 to hit a nip portion of the pair of registration rollers 105 in a rest state to form a loop.

Next, an operation of reading an original document image by the thus-structured image reading apparatus 100 in an in-flow reading mode will be described. When an original document image is read in the in-flow reading mode, the arm 54 is first lowered until the pickup roller 51 abuts a top surface of the original documents, and the pickup roller 51 is then rotated to convey the original document at the top to the pair of separating rollers 52, 53. If a plurality of sheets of the original documents are conveyed in an overlapping manner, the pair of separating rollers 52, 53 separates an original document at the top from other documents and conveys the separated document. The single original document thus-separated is conveyed by the pairs of conveying rollers 104 to the pair of registration rollers 105. After the leading edge of the original document is aligned by the pair of registration rollers 105, the original document is guided by the pair of registration rollers 105, a feed-out roller 106 and the reading roller 107 to the first image reading unit 150, and passes onto the surface glass member 151. At this time, (a CCD 158 of) the first image reading unit 150 reads image information on the front surface (i.e. the first face) of the original document.

Then, after the reading of the image on the front surface of the original document is completed, the original document is conveyed to the second image reading unit 103 by an intermediate conveying roller 108 and the rear surface reading roller 109. While the original document passes the rear surface glass 103b, the contact image sensor 103a reads image information on the rear surface (i.e. the second face) of the original document. After the reading of the image on the rear surface of the original document by the contact image sensor 103a is completed, the original document is discharged on a discharge tray 112 by a pair of discharge rollers 111. The discharge tray 112 is arranged below the original document accommodating unit 101.

Figure 2A:
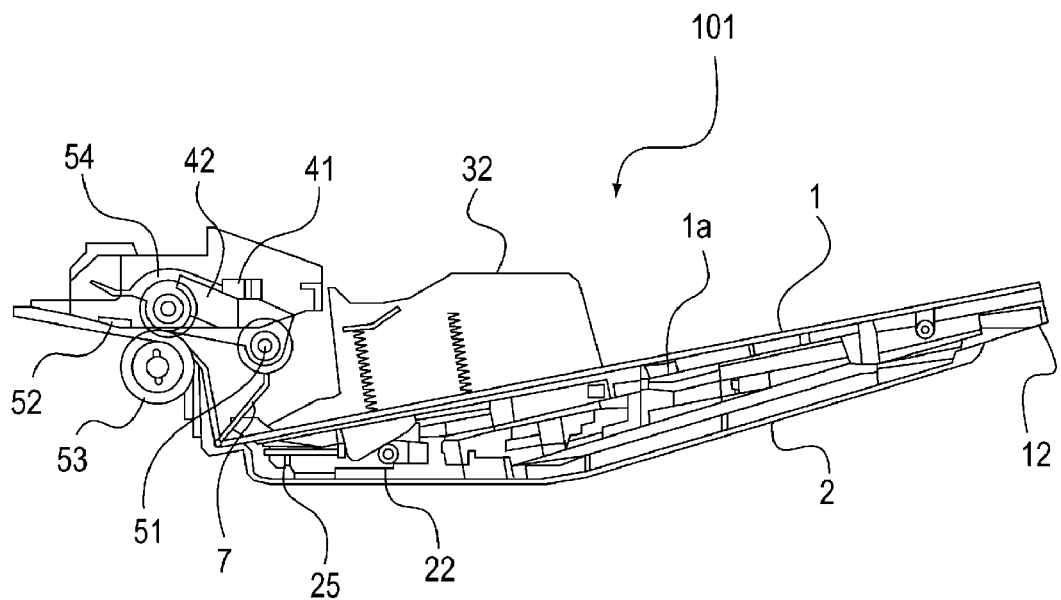
FIGS. 2A and 2B are illustrations for describing a structure of a document tray of an automatic document feeder which is the sheet feeding apparatus.
Figure 2B:
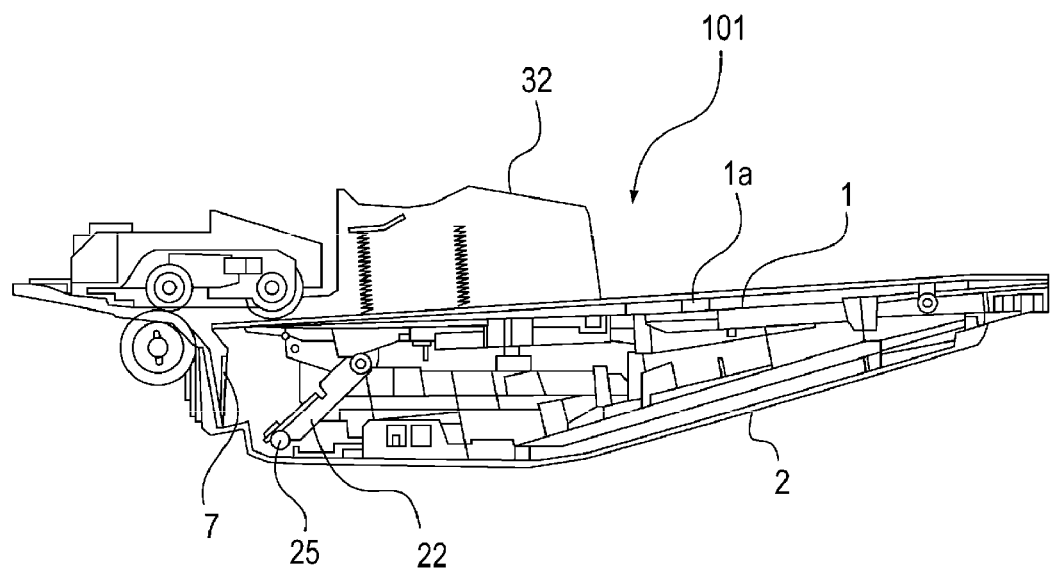

FIGS. 2A and 2B are sectional views illustrating the structure of the original document accommodating unit 101. The original document accommodating unit 101 accommodates original documents which are inserted along the original document feeding direction (also known as the sheet feeding direction). The original document accommodating unit 101 includes a placing plate 1, which is a placing member having an original document placing surface 1a and which is capable of being lifted and lowered by a lifting/lowering mechanism, and a base plate 2, which supports the placing plate 1 so that the placing plate 1 can be lifted and lowered. Original documents are inserted and set along the original document placing surface 1a of the placing plate 1 in the original document feeding direction by a user.

Figure 18A:
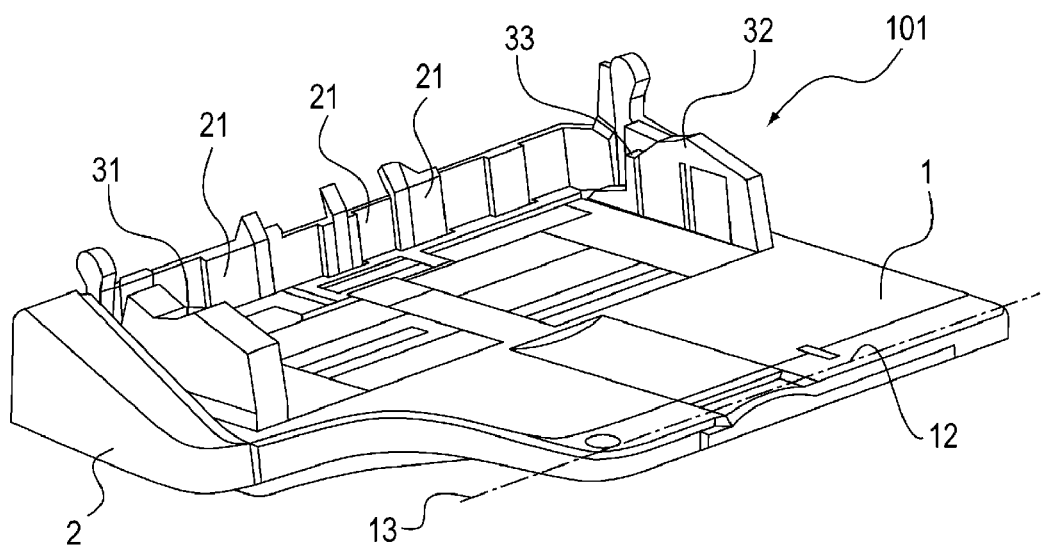
FIGS. 18A and 18B are perspective views illustrating a structure of a document accommodating unit of a sheet feeding apparatus.
Figure 18B:
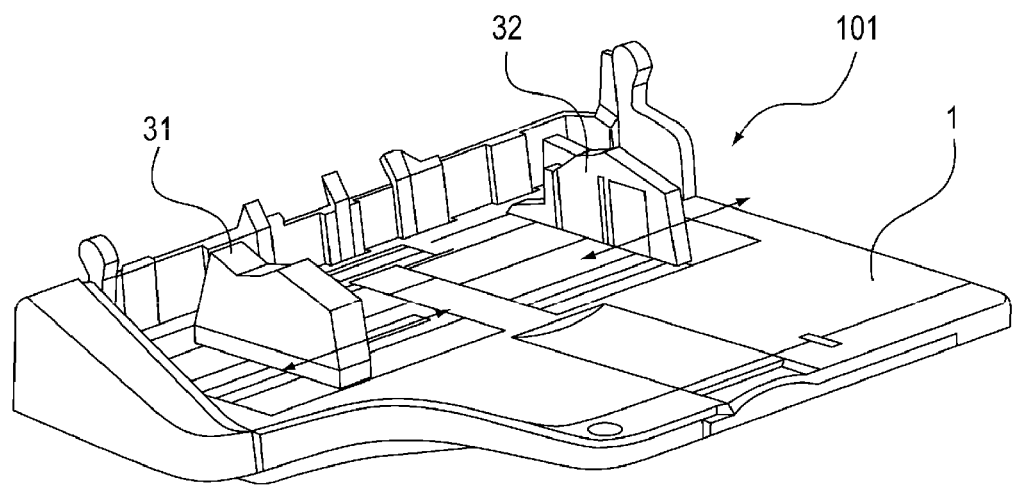

FIGS. 18A and 18B are perspective views illustrating the structure around the original document accommodating unit 101. A pair of side edge restricting plates 31, 32, which restrict both edges of the original documents in the width direction perpendicular to (intersecting with) the original document feeding direction, are attached to the original document accommodating unit 101. The pair of side edge restricting plates 31, 32 are slidably attached in the width direction of the original documents and may slide in a lateral direction shown by arrows in FIG. 18B. If the original documents are placed over an allowable maximum stacking amount, the sheets are not conveyed stably by the pickup roller 51. Accordingly, a rib 33 which restricts the sheet stacking amount is formed on each of the pair of side edge restricting plates 31, 32 so that the sheets are not placed on the placing plate 1 over the allowable stacking amount.

Figure 3:
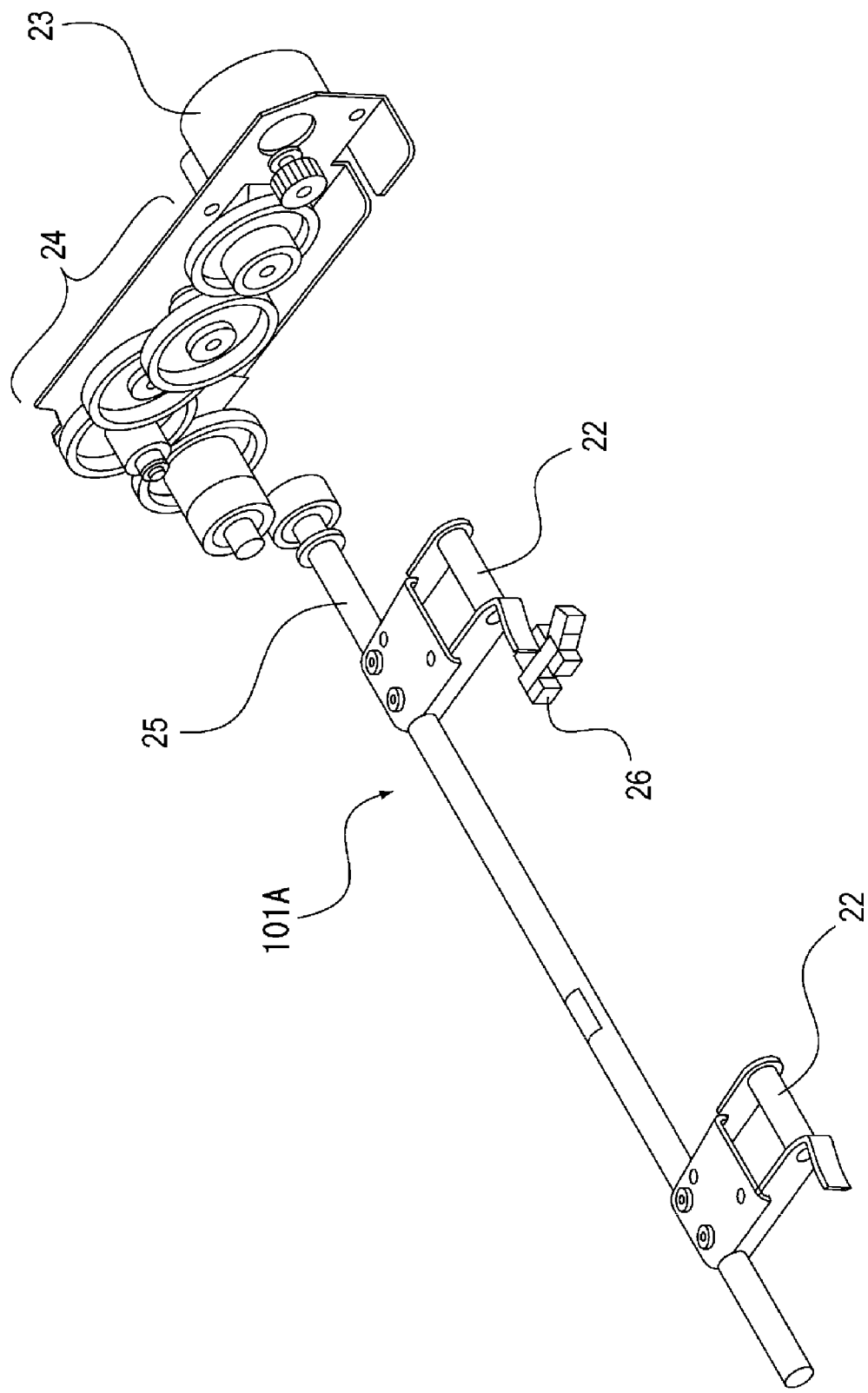
FIG. 3 is an illustration of a lifting and lowering mechanism of a placing plate arranged in the document tray.

One side edge restricting plate 32 is illustrated in FIGS. 2A and 2B. The placing plate 1 is joined with the base plate 2 by a pivoting shaft 12 at an arbitrary position, which is a position along the base plate other than the leading end (in the document feeding direction) of the placing plate 1. The pivoting shaft enables the lifting and lowering about the shaft of the placing plate 1. The placing plate 1 is lifted and lowered by a lifting and lowering mechanism 101A illustrated in FIG. 3, which is arranged below the placing plate 1 in the present embodiment.

The lifting and lowering mechanism 101A includes a pushing-up member 22, which pushes the placing plate 1 up from below, a placing plate drive source 23 such as a pulse motor, and a drive transmission unit 24, to which the pushing-up member 22 is secured via a rotating shaft 25 and which transmits the rotary drive of the placing plate drive source 23 to a rotating shaft 25. The placing plate 1 is lifted and lowered as the pushing-up member 22 is rotated integrally with the rotating shaft 25 by means of the placing plate drive source 23 and the drive transmission unit 24 which transmits rotary drive to the pushing-up member 22. When an original document surface detection sensor 41 illustrated in FIG. 2, which detects a top surface position of the placed original documents, detects that the top surface of the original documents has reached an appropriate height for feeding, the feeding of the original documents is started. A set position detection sensor 26 illustrated in FIG. 3 detects that the placing plate 1 has reached a set position, which is the lowermost position, by the operation of the lifting and lowering mechanism 101A.

Figure 4A:
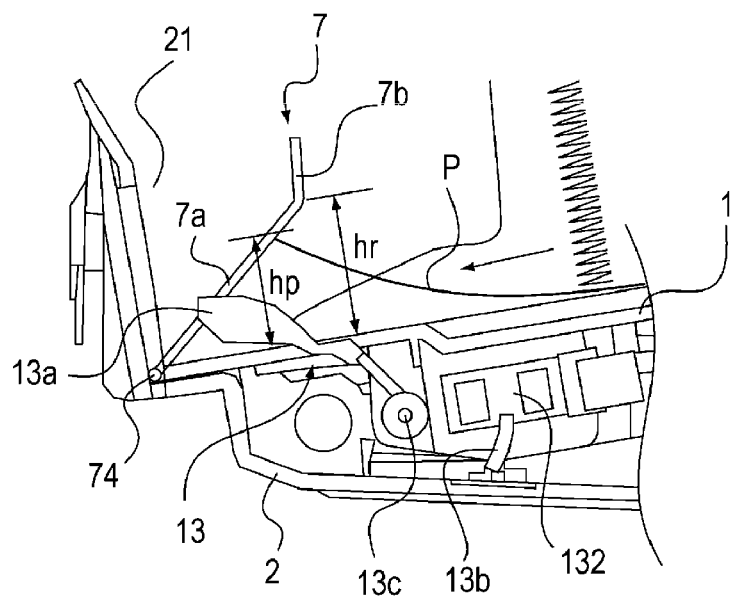
FIGS. 4A to 4C are illustrations for describing lifting and lowering operations of the placing plate.
Figure 4B:
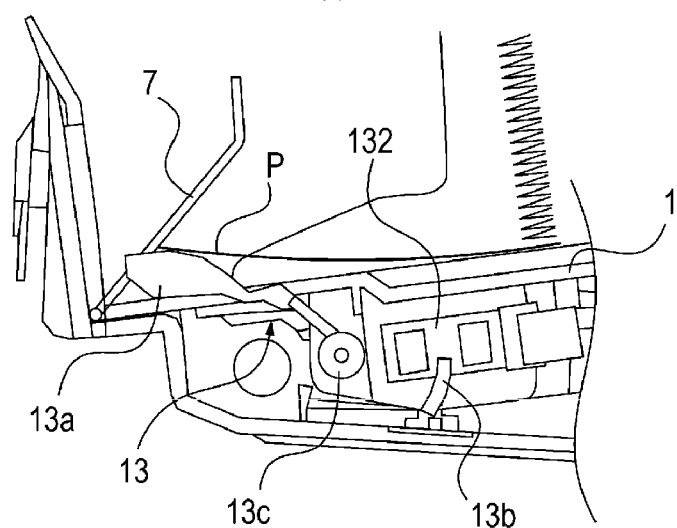
Figure 4C:
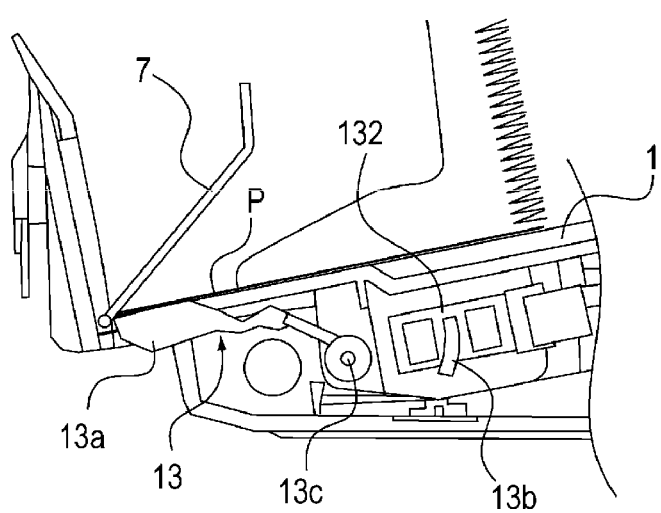

As illustrated in FIGS. 4A to 4C, a transmission-type, original document, detection sensor 132, which is a detection unit configured to detect whether original documents are placed on the placing plate 1, is attached below the placing plate 1. Further, a flag 13 is attached to the placing plate 1 so that the flag 13 can rock (i.e. rotate) about a rocking shaft 13c as a support point. The original document, detection sensor 132 and the flag 13 are arranged at the downstream end portion of the original document placing surface 1a in the original document feeding direction. The original document, detection sensor 132 and the flag 13 detect whether sheets are placed on the placing plate 1 on a downstream end portion in the original document feeding direction of the placing plate 1. The flag 13 includes a pressing portion 13a, which is pressed by original documents when the original documents are placed on the placing plate 1, and a light shielding portion 13b, which blocks light to the original document set detection sensor 132. The pressing portion 13a of the flag 13 protrudes on the upper surface of the placing plate by means of a biasing unit (not illustrated) until original documents are placed on the placing plate 1. When original documents are placed on the placing plate 1, the pressing portion 13a is pressed by the original documents whereby the flag 13 rocks in the counterclockwise direction as seen in FIGS. 4A, 4B and 4C.

When the flag 13 rocks in this manner, the light shielding portion 13b brings the original document set detection sensor 132 into a light-shielded state. Accordingly, the original document set detection sensor 132 can detect that the original documents are placed on the placing plate 1. When no original document remains on the placing plate 1, the flag 13 rocks in the clockwise direction by the biasing unit (not illustrated) so that the pressing portion 13a protrudes on the upper surface of the placing plate. When the flag 13 rocks in this manner, the light shielding portion 13b moves away from the original document set detection sensor 132 and the original document set detection sensor 132 is released from the light-shielded state. Accordingly, the original document set detection sensor 132 can detect that no original document remains on the placing plate 1.

If the feeding interval of the original documents is short at the original document accommodating unit 101, the time for determining that no original document remains may not be sufficient. Accordingly, if the detection of the last original document is delayed, such a situation that the original document feeding operation continues after the last original document on the placing plate is fed may occur. Therefore, the time for determining that no original document remains after starting feeding of the last sheet is preferably shortened to shorten the feeding interval of the original documents. Here, if the presence or absence of the original documents is detected by the turning of the flag at the original document tray, it will take much time to determine that no original document remains when the rotating distance of the flag from the state where the flag is pressed by the placed original documents until the detection sensor detects that no original document remains is large. Therefore, in the present embodiment, the flag 13 protrudes by a small amount on the placing surface of the placing plate 1 to make the rotating distance of the flag to a detection position smaller so as to detect that no original document remains on the placing plate 1 (hereinafter referred to as the last sheet detection) in a short time.

Figure 5:
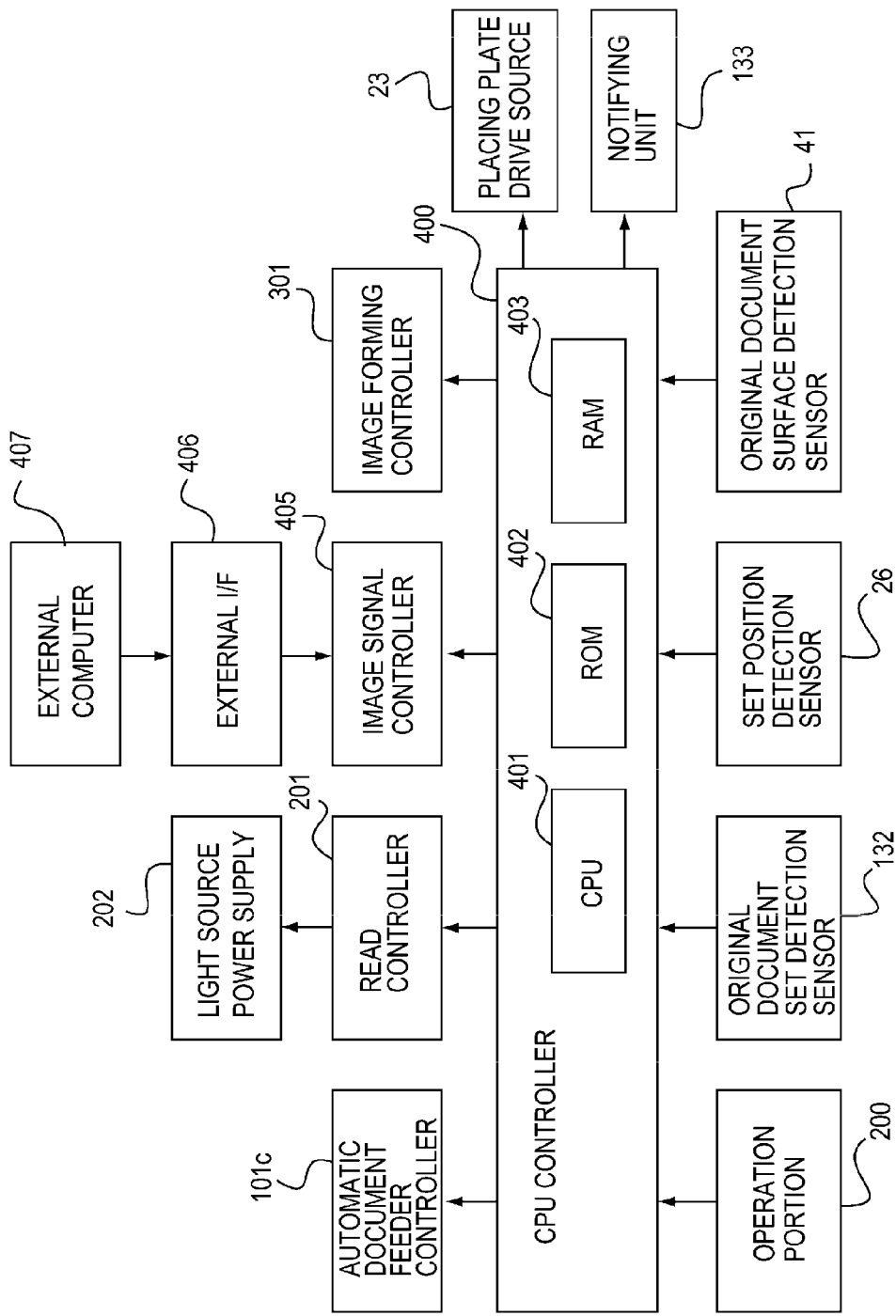
FIG. 5 is a control block diagram of the image reading apparatus.

FIG. 5 is a control block diagram of the image reading apparatus 100. A CPU controller 400 includes a CPU 401 and controls an automatic document feeder controller 101C, a read controller 201, an image signal controller 405, and an image forming controller 301 according to control programs stored in a ROM 402 and settings of an operation portion 200. The CPU controller 400 also controls the placing plate drive source 23 and a notifying unit 133. The automatic document feeder controller 101C controls the automatic document feeder (ADF) 100B shown in FIG. 1 and the read controller 201 controls a light source power supply 202 which turns on the lamp 153 of the first image reading unit 150. The operation portion 200 includes a plurality of keys for setting various functions relating to image formation (such as 1-or 2-sided printing, collated pages or not, etc.), and a display portion which displays the setting state. The operation portion 200 outputs key signals corresponding to respective keys operated by a user to the CPU controller 400 and displays corresponding information on the display portion based on signals from the CPU controller 400.

A RAM 403 is utilized as an area for temporarily storing control data and as a work area for arithmetic operation associated with the control. An external interface (I/F) 406 is an interface between the image reading apparatus 100 and an external computer 407, and is configured to convert print data from the external computer 407 to a bitmap image and output the bitmap image as image data to the image signal controller 405. The image forming controller 301 outputs the image data from the image signal controller 202 to the image forming unit of the image forming apparatus (not illustrated).

The original document, detection sensor 132, the set position detection sensor 26 and the original document surface detection sensor 41 described above are also connected to the CPU controller 400. The CPU controller 400 controls the lifting and lowering operations and the original document feeding operation of the placing plate 1 of the automatic document feeder 100B according to signals from the respective sensors. Next, control of an original document conveying operation of the automatic document feeder 100B will be described with reference to a flowchart illustrated in FIG. 6.

When original documents are set on the placing plate 1 and the original document set detection sensor 132 detects the original documents (Y in S401), the CPU controller 400 activates the notifying unit 133 such as a lamp or a sound source (S402) to inform a user of the detection. The original document set detection sensor 132 moves to stand-by mode, when the original document set detection sensor 132 does not detect the original documents (N in S401). The activation of the notifying unit 133 allows a copy starting instruction or a scanning starting instruction by a user to be in an effective state, and then the CPU controller 400 is waiting for those instructions (N in S403). Next, when a conveyance starting instruction is input through the operation portion 200 automatically or by a user (Y in S403), the arm 54 including a flag 42, which when raised blocks the original document surface detection sensor 41 illustrated in FIG. 2A, is lowered and the pickup roller 51 supported by the arm 54 is moved to the lowermost position. Further, the driving by the placing plate drive source 23 is started (S404) and the lifting operation of the placing plate 1 is started. The lifting operation of the placing plate 1 continues until the pickup roller 51 which has moved to the lowermost position is pushed up by the top surface of the placed original documents and the flag 42 of the arm 54—lifted with the pushing up of the pickup roller 51—blocks the original document surface detection sensor 41. When the flag 42 blocks the original document surface detection sensor 41, the position of the top surface of the placed original documents comes to a position where the original documents can be fed (hereinafter referred to as the feeding position). With such a structure, the placing plate 1 is lifted to the uppermost position as illustrated in FIG. 2B when one sheet of the original document is placed, for example.

Next, when the original document surface detection sensor 41 detects that the top surface of the original documents has reached the feeding position (Y in S405) as a result of blocking by the flag 42, the driving by the placing plate drive source 23 is stopped (S406). This detection continues until the original document surface detection sensor 41 detects the original document (N in S405). Subsequently, control of original document conveyance including original document feeding, original document conveyance and image reading is started (S407) such that the original document(s) is/are conveyed to a position to be read. The control of original document conveyance continues until the original document set detection sensor 132 detects that no original document remains on the placing plate (Y in S408). When the original document set detection sensor 132 detects that no original document remains on the placing plate (N in S408), the control of original document feeding (and thus the original document feeding) terminates (S409). When the control of original document feeding terminates, the driving by the placing plate drive source 23 is started (S410) to start the lowering operation of the placing plate 1. The lowering operation of the placing plate 1 continues until the set position detection sensor 26 detects the lower limit position of the pushing-up member 22 under the placing plate (N in S411). When the set position detection sensor 26 detects the lower limit position of the pushing-up member 22 (Y in S411), the driving of the placing plate drive source 23 is terminated (S412). Thereafter, the control is in a standby mode until next original documents are set.

Figure 6:
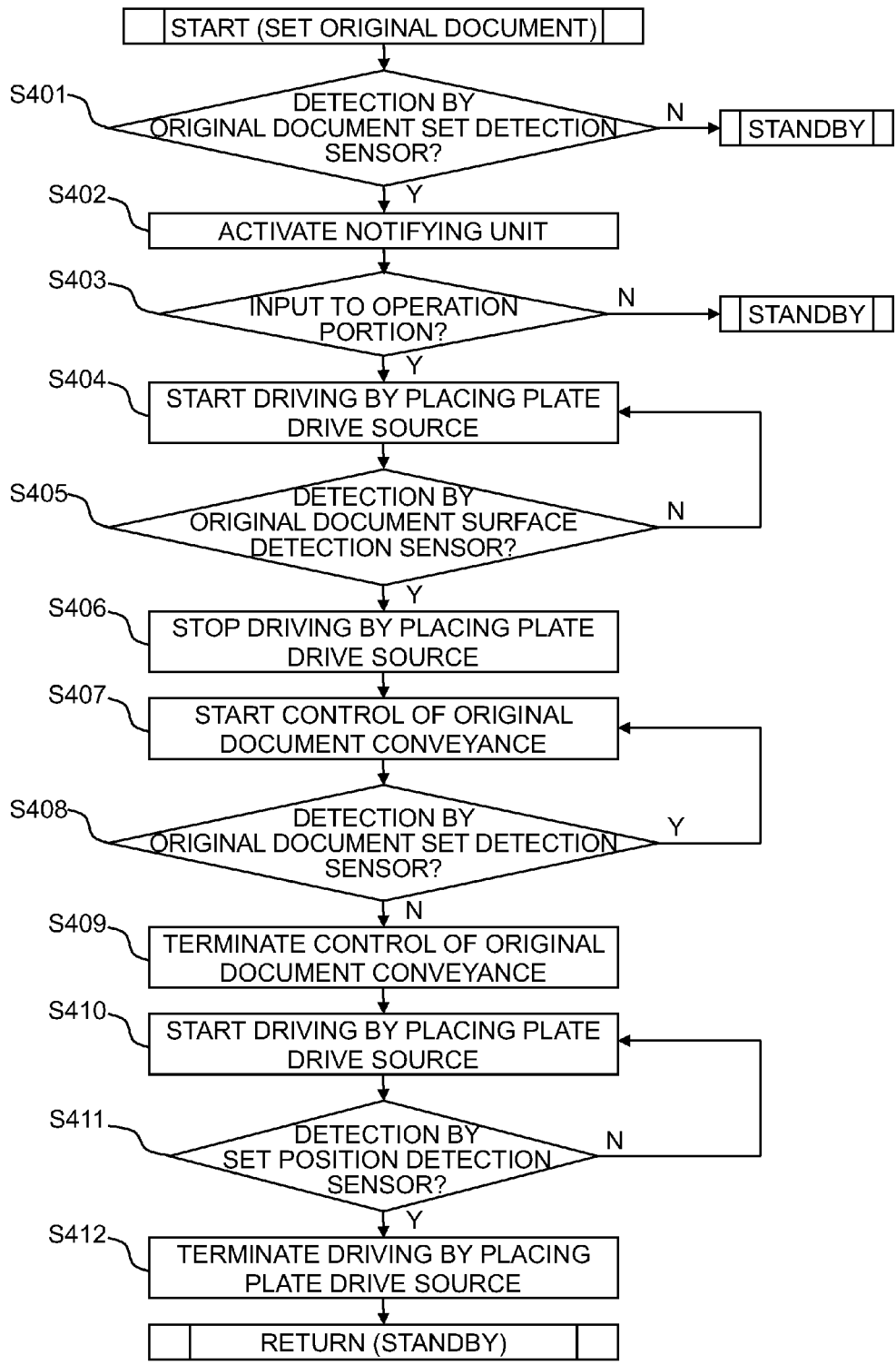
FIG. 6 is a flowchart describing control of an original document conveying operation of the automatic document feeder.

According to a further aspect of the invention, a controller may be provided that, when connected to the sheet feeding apparatus, causes the sheet feeding apparatus to perform the method as illustrated in FIG. 6 and as described above. The controller may be a part of the sheet feeding apparatus or part of the image reading apparatus, or may even be an external controller in a computer, for instance. The controller may control the standby state that the sheet feeding apparatus enters if the detection sensor does not detect an original document (N in S401) or if no conveyance starting instruction is input (N in S403). The controller may further control the feedback mechanisms in steps S405, S408 and S411 of FIG. 6, namely driving the placing plate until the surface of an original document is detected by an original document surface detector (S404, S405); conveying the original document until no original documents are detected by the original document set detection sensor (S407, S408); and driving the placing plate until the position of the pushing up member 22 is detected by the set position detection sensor (S410, S411) respectively.

Figure 7:
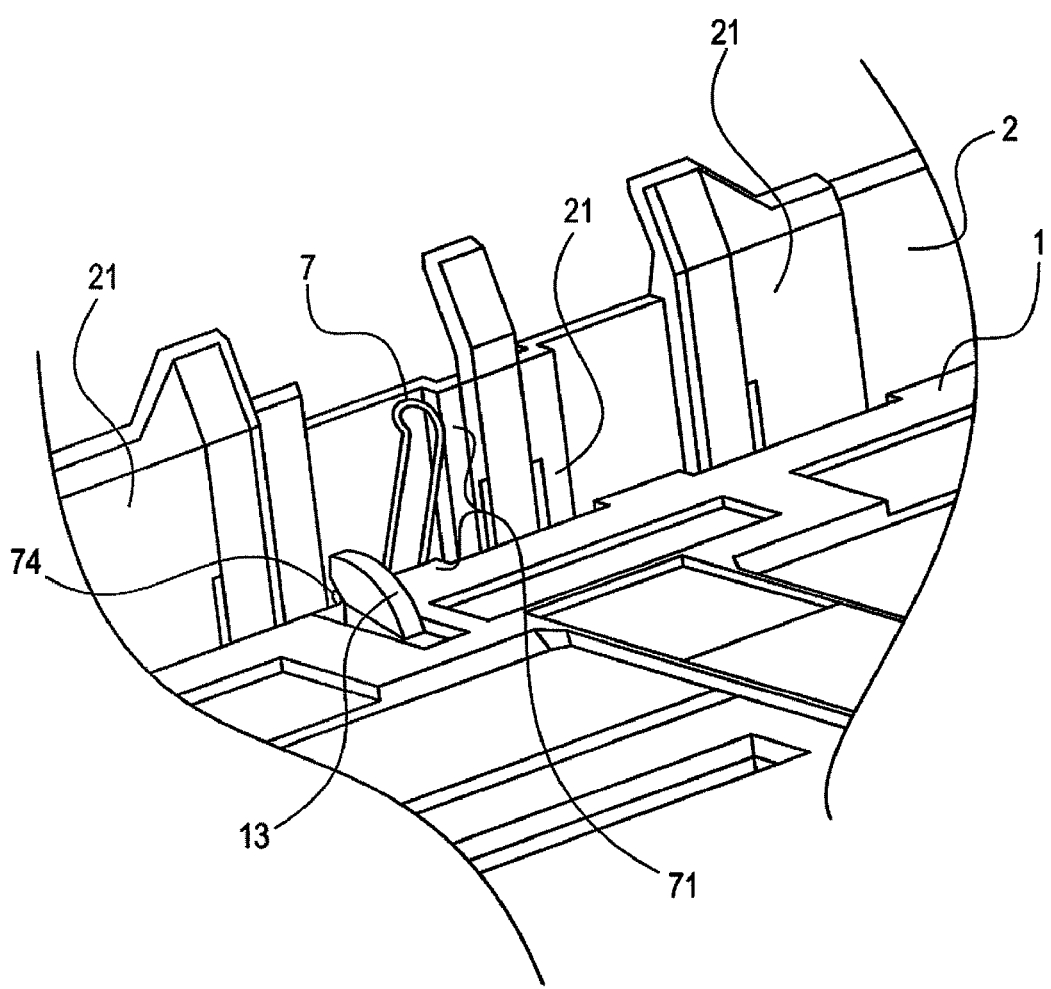
FIG. 7 is a first illustration of a curl suppressing member attached to the placing plate.

In the present embodiment, a curl suppressing member 7, which suppresses curl of original documents placed on the placing plate 1, is arranged above the original document placing surface of the placing plate 1 as illustrated in FIG. 7 in a manner that the curl suppressing member 7 is in an inclined state in which a downstream end thereof in the original document feeding direction (a downstream side thereof in the sheet feeding direction) is lower than an upstream end. The curl suppressing member 7, which is a pressing member adapted to press the sheets, is formed from a bent wire, for example, and has an abutment portion 71 that abuts leading edges of the original documents accommodated along the sheet feeding direction, and pivot portions 74 which are a pivoting center. The pivot portions 74 formed at one end of the curl suppressing member 7 (or at both ends of a bent wire as shown in FIG. 7) are elastically latched to a pivoting supporting member 73, illustrated in FIG. 8A, which is itself attached to an inner side of an abutting portion 21 of the base plate 2. This allows the curl suppressing member 7 to be pivotably supported to the base plate 2.

Figure 9A:
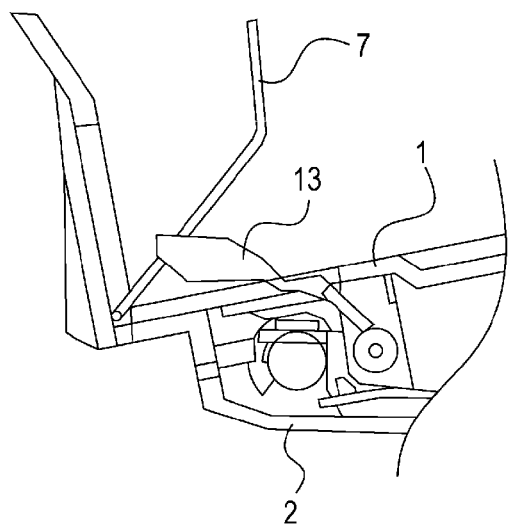
FIGS. 9A to 9C illustrate the movement of the curl suppressing member with lifting and lowering of the placing plate.
Figure 9B:
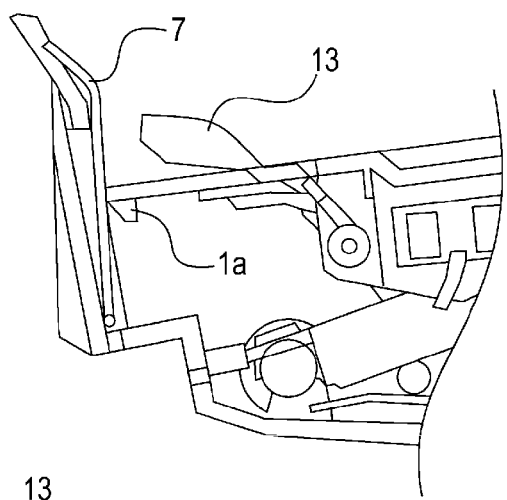
Figure 9C:
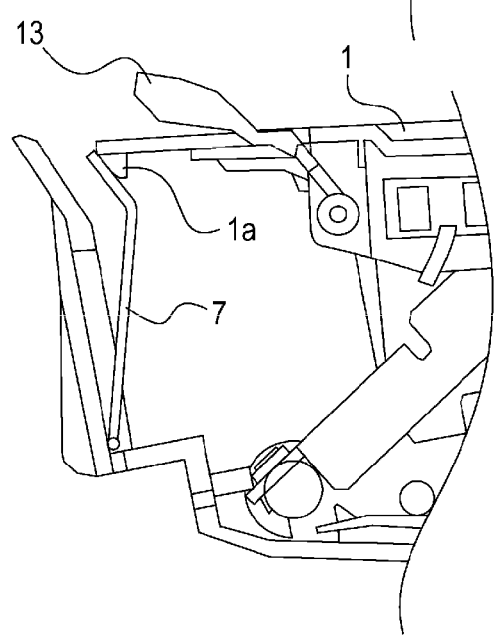

The curl suppressing member 7 can be positioned in a pressing position (suppressing position), as illustrated in FIG. 9A which will be described below, at which the curl suppressing member 7 presses the sheets to suppress upward curl of the leading edges of the set original documents. The curl suppressing member 7 is in the inclined state at the suppressing position. The curl suppressing member 7 can also be retracted from the original document conveying surface to be positioned at a separated position (retracting position), as illustrated in FIG. 9C which will be described below, away from the sheets when the original documents are fed. The suppressing position of the curl suppressing member 7 is a position at which the abutment portion 71 is inclined to the upper surface of the placing plate 1 at an angle of 45 to 55 degrees, as illustrated in FIGS. 4A to 4C described above. The suppressing position is determined by abutment between the curl suppressing member 7 and the placing plate 1 in a state where the pivot portions 74 of the curl suppressing member 7 are positioned lower than the upper surface of the placing plate 1 and in the inner side of the abutting portion 21 of the base plate 2. Alternatively, the suppressing position is determined by the abutment of the curl suppressing member 7 and the pivoting supporting member 73 in a predefined orientation.

The abutment portion 71 of the curl suppressing member 7 has a suppressing portion 7a which protrudes above the placing plate 1 to suppress upward curl of the original documents entering between the curl suppressing member 7 and the placing plate 1 when the curl suppressing member 7 is at the suppressing position as illustrated in FIG. 9A, for example. When the curl suppressing member 7 is at the suppressing position, the suppressing portion 7a, which is a pressing portion, is in the inclined state so as to be closer to the original document placing surface 1a at downstream side in the original document feeding direction than at the upstream side. The suppressing portion 7a in the inclined state is adapted to press the leading edges of the original documents placed on the placing plate 1. The curl suppressing member 7 guides the downstream edges in the original document feeding direction of the original documents inserted in the sheet feeding direction along the original document placing surface 1a toward the original document placing surface 1a (toward the flag 13) and presses the downstream edges of the original documents set on the placing plate 1 in the sheet feeding direction toward the original document placing surface 1a. The abutment portion 71 of the curl suppressing member 7 also includes a restricting portion 7b which extends upward from the suppressing portion 7a and which is adapted to restrict accommodation of original documents with a particularly large curl that cannot be suppressed by the suppressing portion 7a into the placing plate 1. With such a structure of the curl suppressing member 7, the curl suppressing member 7 is prevented from obstructing the lowering operation of the placing plate 1, and original documents with upward curl or fold which cannot be ensured to be appropriately handled by the pair of separating rollers are prevented from being set (i.e. inserted in a correct feeding position), as will be described below.

When original documents are set on the placing plate 1 to which the curl suppressing member 7 is attached, the original documents are placed in a manner that the leading edges thereof abut the abutting surface 21 of the base plate 2 if the leading edges of the original documents are not curling or folded or if the leading edges curl or are folded downward. On the other hand, the original documents are inserted ahead until the leading edges thereof abut the abutting surface 21 while curl or the like of the leading edges is suppressed along the inclined restricting portion 7a of the curl suppressing member 7 represented by a height hr as illustrated in FIG. 4A described above if the leading edges of the original document curl or are folded upward. Thus, when the leading edges of the original documents abut the abutting surface 21, the original documents are set on the placing plate in a state where the upward curl or fold of the leading edge portion (the downstream edge portion in the sheet feeding direction) is suppressed (corrected).

Accordingly, by providing the curl suppressing member 7, the original documents can be set on the placing plate in a state where the curl or fold is suppressed. Further, by suppressing the upward curl or fold of the leading edges in this manner, the placement of original documents can be accurately detected by means of the flag 13 and the original document set detection sensor 132. For example, if the curl suppressing member 7 is not provided, the flag 13 cannot be pressed down when original documents having leading edges curling or folded upward are set so that the leading edges abut the abutting portion 21 due to the curl or the like of the leading edges. As a result, the setting of the original documents may not be detected.

In the present embodiment, however, corner portions of leading edges of original documents are ensured to be brought into contact with the suppressing portion 7a when the original documents are placed on the placing plate 1 since the suppressing portion 7a of the curl suppressing member 7 is inclined in a manner that the downstream side thereof in the sheet feeding direction is lower. Consequently, the upwardly curling leading edge portions of the original documents can be ensured to be pressed by the curl suppressing member 7. Specifically, by providing the curl suppressing member 7, the upward curl or fold of the leading edges of the original documents can be suppressed and the flag 13 can be rotated by the original documents P as illustrated in FIG. 4B. Thus, the detection sensor 132 can detect the setting of original documents.

In addition, if the curl suppressing member 7 is not provided, large upward curl of leading edges of original documents may further turn up when the original documents are being placed on the placing plate 1. However, by providing the curl suppressing member 7, the curl suppressing member 7 can press the large upward curl of the leading edges of the original documents when such original documents are being placed on the placing plate 1 so as to prevent turning up of the curl.

Further, there may be a case where original documents P, illustrated in FIG. 4A, having upward curl or fold of a height hp higher than the height hr of the inclined suppressing portion 7a of the curl suppressing member 7 (hp>hr) are placed. Here, the height hr of the inclined suppressing portion 7a is equal to or lower than an amount of curl or fold (hT) at which original documents can be ensured to be conveyed by the pair of separating rollers 52, 53 downstream of the original document tray without causing a jam. In this case, even if the original documents are attempted to be placed, the leading edges of the original documents escape upward before the curl suppressing member 7 due to the restricting portion 7b extending from the suppressing portion 7a of the curl suppressing member 7.

Accordingly, accommodation of original documents with large curl, which cannot be suppressed by the suppressing portion 7a, onto the placing plate 1 is restricted, and the detection sensor 132 does not detect the setting of the original documents and thus does not output the detection signal to the CPU controller 400 in this case. Specifically, in the present embodiment, the shape of the curl suppressing member 7 satisfies hT>hr, so that only original documents having the amount of curl or fold at which the pair of separating rollers 52, 53 can ensure to convey the original documents can be set on the placing plate 1. Accordingly, a jam can be prevented from being caused.

Figure 11A:
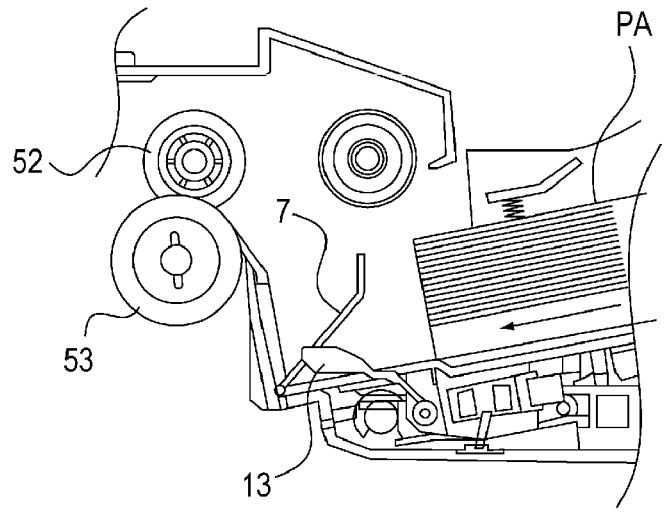
FIGS. 11A to 11C illustrate the movement of the curl suppressing member when a sheet bundle is stacked.
Figure 11B:
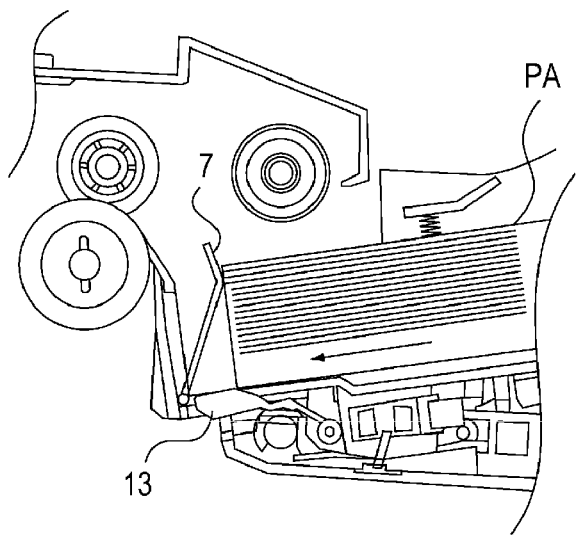
Figure 11C:
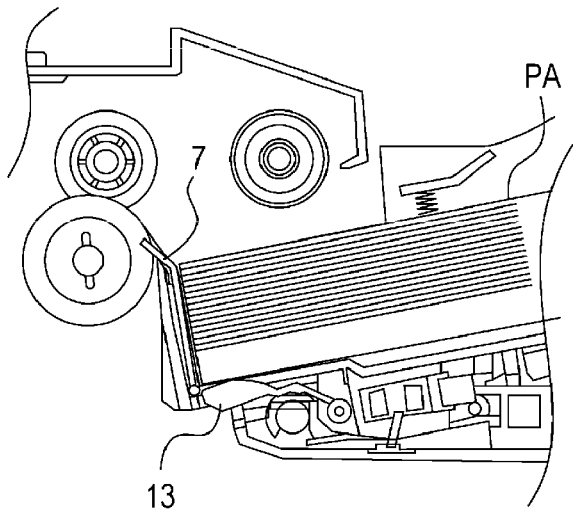

When original documents are set as described above, lifting of the placing plate 1 is started. At this time, if the number of sheets of original document bundle (sheet bundle) PA (as shown in FIGS. 11A, 11B and 11C) is a predetermined number or smaller, the leading end in the original document feeding direction (downstream end in the sheet feeding direction) of the placing plate 1 abuts the curl suppressing member 7 protruding above the placing plate 1. Accordingly, the curl suppressing member 7 is raised in a manner that its angle with respect to the placing plate 1 is increased by the placing plate 1 being lifted as illustrated in FIGS. 9A to 9C in this order to be moved to the retracting position. That is, in the present embodiment, the curl suppressing member 7 is moved to the retracting position by the placing plate 1 being lifted in feeding original documents when the number of sheets of the original document bundle PA is the predetermined number or smaller.

Figure 10:
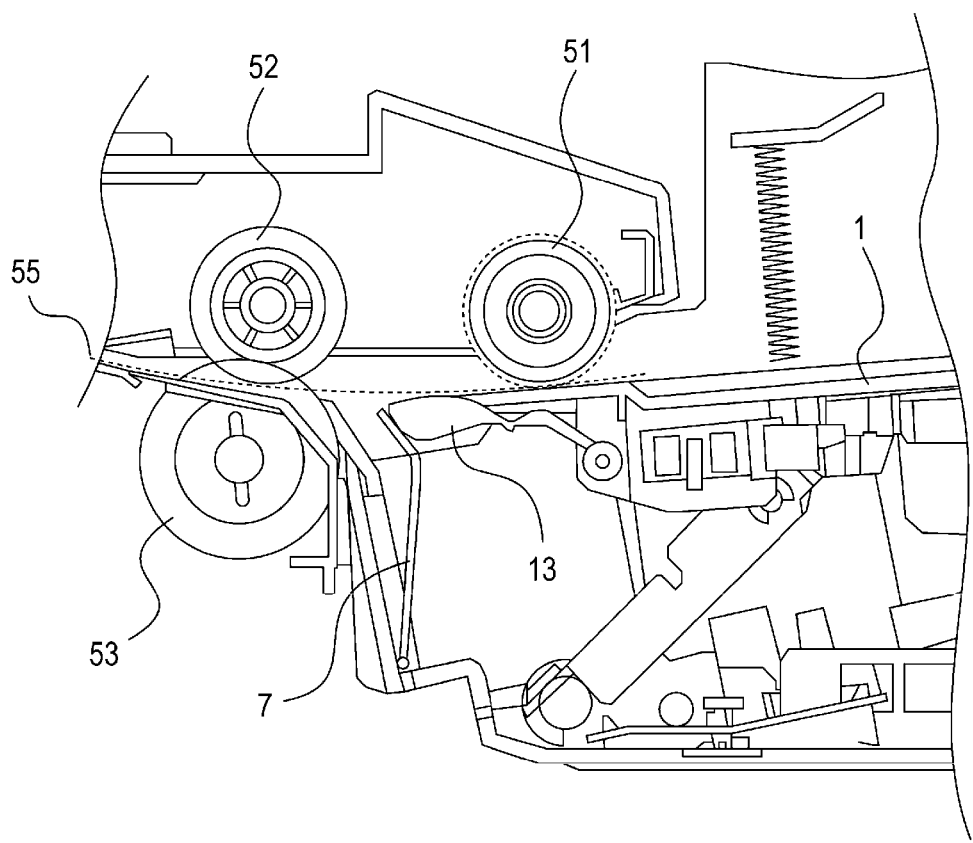
FIG. 10 illustrates the placing plate in a state where one sheet is at a feeding position.

The retracting position is a position at which a top end of the curl suppressing member 7 is lower than the top surface of original documents, that is, a position to which the top end of the curl suppressing member 7 is retracted from a conveyance path shown by a dashed and a dotted line 55 in FIG. 10 through which the original documents are fed by the pickup roller 51 and further conveyed while being separated by the pair of separating rollers 52, 53. By moving to the retracting position, the curl suppressing member 7 is prevented from obstructing the feeding operation. FIG. 10 illustrates the feeding position when one sheet of original document is placed. However, the height of the top surface of original documents at the feeding position does not change even when more than one sheet of original documents is placed.

When the curl suppressing member 7 is moved to the retracting position, the curl suppressing member 7 is in a state abutting a projection 1a (see FIGS. 9B and 9C) under the placing plate, so that the curl suppressing member 7 is fixed at a position at which the curl suppressing member 7 does not protrude on the original document conveying surface. Furthermore, in the present embodiment, the curl suppressing member 7 never presses the upper surface (printed surface) of the placed original document while moving all the way from the suppressing position illustrated in FIG. 9A to the retracting position illustrated in FIG. 9C. This decreases the likelihood of damaging the surface of an original document due to inserting and removing of the original document during a feeding operation or lifting of the placing plate. In addition, since the curl suppressing member 7 does not come into contact with the surface of a sheet being fed, skew feeding of sheets and feeding failure caused by the curl suppressing member 7 pressing on the sheets are less likely to occur during sheet feeding.

With the structure of the curl suppressing member 7, the curl suppressing member 7 is pressed by the leading edge in the original document feeding direction of an original document bundle (sheet bundle) PA to be moved to the retracting position even when the original document bundle PA of the predetermined number of sheets or more are set as illustrated in FIGS. 11A to 11C. In the case where the curl suppressing member 7 is structured as in the present embodiment, the space of the original document placing portion is not narrowed. Accordingly, even an original document bundle of a large number of sheets can be set without trouble. Further, in the present embodiment, the curl suppressing member 7 is arranged at a position where the curl suppressing member 7 abuts a central portion of an original document of the smallest size (smallest sheet) having the narrowest width among the original documents accommodated in the original document accommodating unit 101. Accordingly, the operation of restricting side edges of original documents can be performed without damaging a side of the original document bundle even when the original document bundle is set while the side edge restricting plate is open and then the side edge restricting plate is caused to slide in the restricting direction of the original document width.

In the present embodiment, when the number of sheets of the original documents is large as illustrated in FIGS. 11A to 11C, the curl suppressing member 7 does not operate to press the leading edges of original documents from above. However, since the number of sheets of the original documents is large, the rigidity of the original document bundle as a whole is high and the self-weight of the original document bundle acts thereon. Accordingly, the leading edges of the original documents will not be separated from the placing surface of the placing plate 1. Therefore, false detection by the original document set detection sensor 132 due to separation of the leading edges of the original documents from the placing surface of the placing plate 1 does not occur.

On the other hand, when the original document set detection sensor 132 detects that no original document remains on the placing surface and therefore terminates the original document conveying operation, the lowering operation of the placing plate 1 is started, and when the set position detection sensor 26 detects the placing plate 1, the lowering operation is terminated and the placing plate 1 is returned to the set position, as described above. At this time, the curl suppressing member 7 also moves from the retracting position to the suppressing position as illustrated in FIGS. 9C to 9A in this order with the lowering operation. In this operation, the placing plate 1 can move smoothly without being caught by the curl suppressing member 7 while the abutting portions of the placing plate 1 and the curl suppressing member 7 are being slid because the curl suppressing portion 7 is bent in the original document feeding direction. The curl suppressing member 7 also moves from the retracting position to the suppressing position as illustrated in FIGS. 11C to 11A in this order when an original document bundle of a large number of sheets is removed.

Figure 8A:
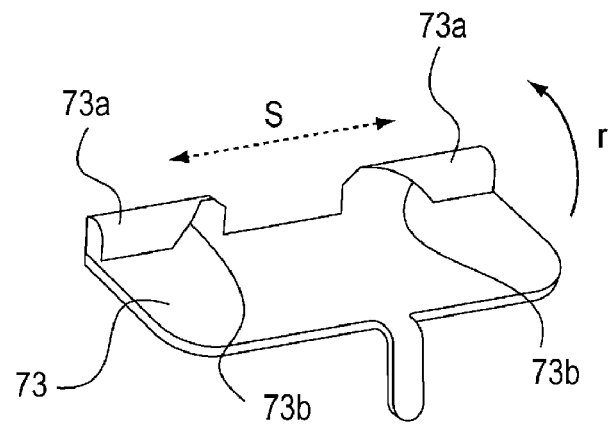
FIGS. 8A and 8B are second illustrations of the curl suppressing member that may be attached to the placing plate.
Figure 8B:
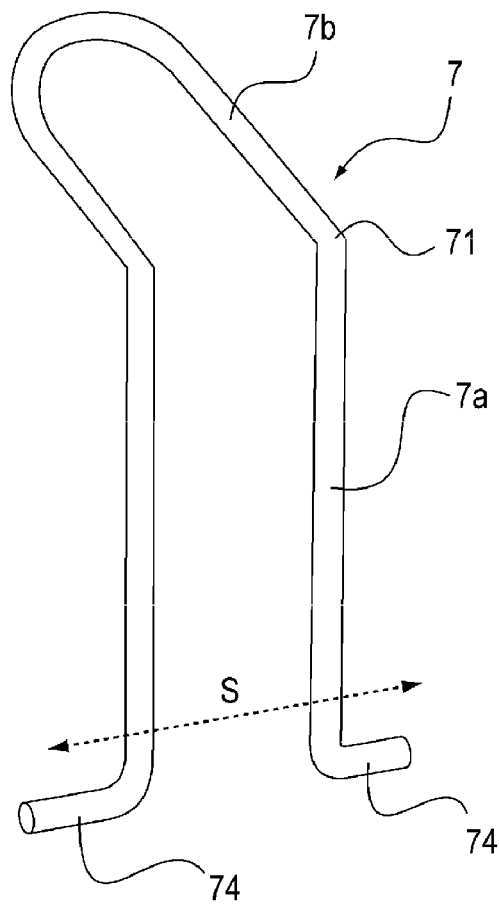

As illustrated in FIGS. 8A and 8B described above, the pivoting supporting member 73 includes a pair of supporting portions 73a which have a substantially cylindrical shape and pivotably support the pivot portions 74 formed at both ends of the curl suppressing member 7. Side surfaces 73b of the pair of supporting portions 73a are in a tapered shape and face each other and abut the pivot portions 74 at both sides of one end of the curl suppressing member 7. Thus, as the restricting member 7 rotates to the retracting position, that is, as the curl suppressing member 7 rotates in the direction r shown in FIG. 8A, the gap between both sides of the bottom end of the restricting member 7 becomes narrower and a force to return outward as shown by a broken line S in FIGS. 8A and 8B is generated in both ends of the restricting member 7.

The force is applied to the side faces 73b facing each other of the pair of supporting portions 73a, and accordingly, a force in a direction opposite to the direction r shown in FIG. 8 to return the curl suppressing member 7 to the suppressing position is generated in the curl suppressing member 7. Accordingly, as the placing plate 1 is lowered, the abutting position of the placing plate 1 and the curl suppressing member 7 moves lower and the curl suppressing member 7 returns to the suppressing position due to the action of the force. With such a structure, the curl suppressing member 7 can be ensured to be moved between the suppressing position and the retracting position without any special drive source needing to be provided.

In the present embodiment, the curl suppressing member 7 is formed by bending a wire so that the sheets are not damaged by the load of the curl suppressing member 7. However, the material and the shape of the curl suppressing member 7 are not limited thereto and may be made in any shape and with any material that enables the invention to be performed. For example, the curl suppressing member 7 is preferably lightweight so as not to damage the original documents and so as not to inhibit the raising of the placing plate.

Figure 12A:
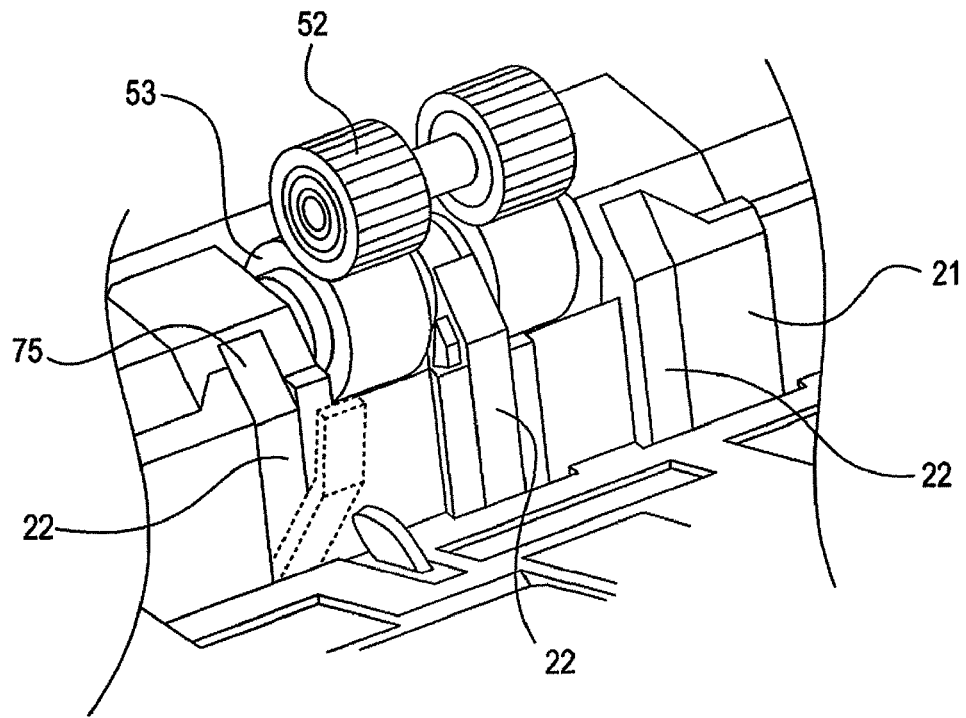
FIGS. 12A and 12B illustrate a structure of a document tray of an automatic document feeder according to a second embodiment of the present invention.
Figure 12B:
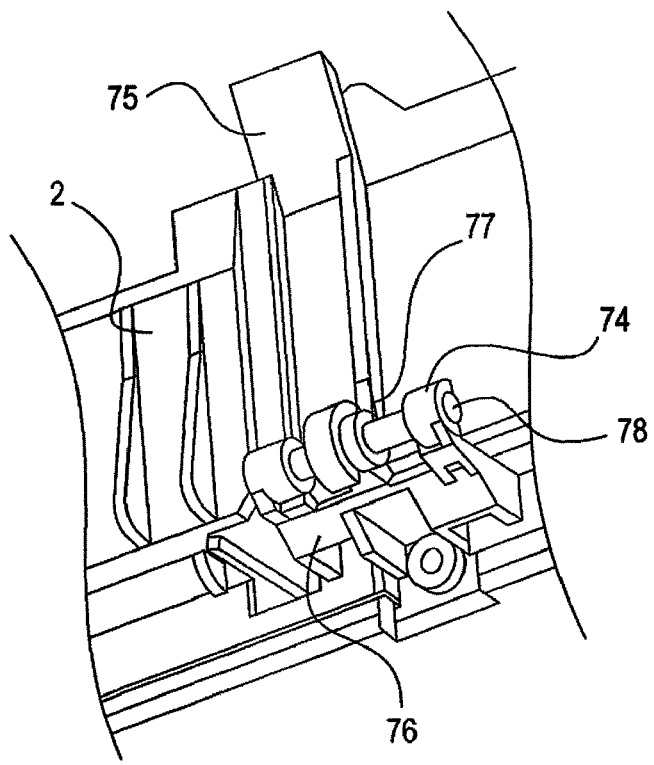
Figure 13:
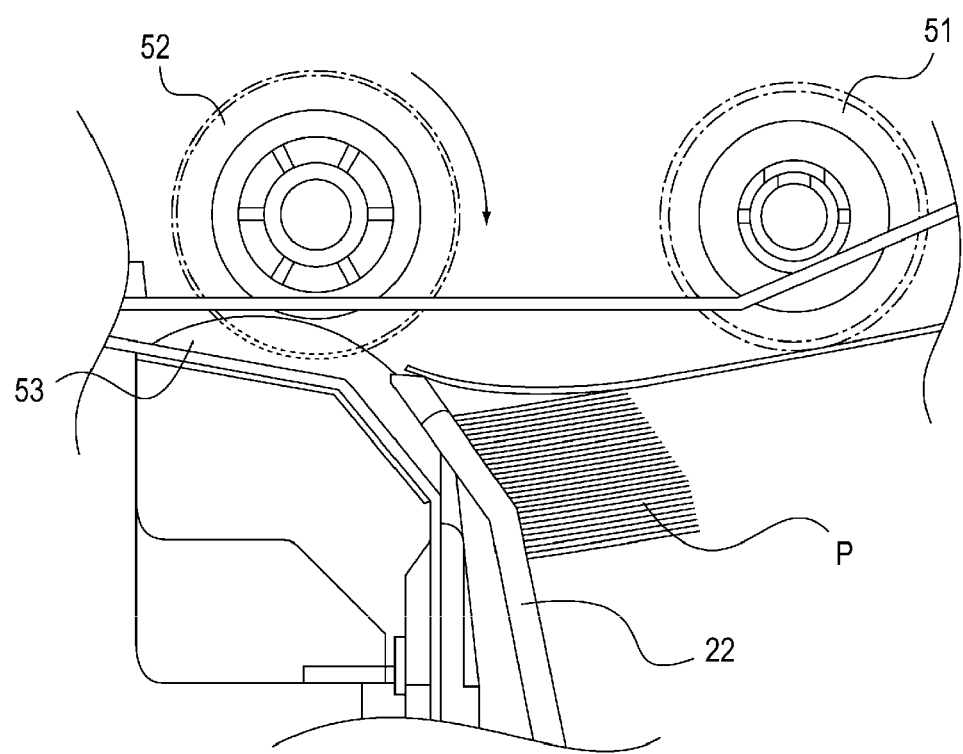
FIG. 13 illustrates an effect of a curl suppressing member attached to a placing plate of the original document tray.

Next, a second embodiment of the present invention will be described. FIGS. 12A and 12B illustrate a part of an original document tray of an automatic document feeder according to the present embodiment. In FIGS. 12A and 12B, the same components as shown in FIGS. 2A, 2B and 7 are labeled using the same reference numerals. In FIG. 12A, a curl suppressing member 75 can move between a retracting position illustrated with a solid line and a suppressing position illustrated with a broken line. Pre-separation plates 22 which constitute a separating portion are arranged on an inclined surface of the abutting portion 21. By providing the pre-separation plates 22, original documents can be loosened or separated when the original documents are fed by the pickup roller 51 and then conveyed to the pair of separating rollers 52, 53, as illustrated in FIG. 13.

In the present embodiment, the curl suppressing member 75 rotates around a pivot shaft 78 and has a pivoting portion 74 (such as a sleeve) formed along the pivot shaft 78, as illustrated in FIG. 12B. The pivoting portion 74 is attached to a pivoting supporting portion 76 attached to the base plate 2 so that the curl suppressing member 75 is pivotably attached to the base plate 2. A torsion spring 77 is attached to the circumference of the pivoting portion 74 so that the curl suppressing member 75 is normally held at (e.g. by being biased toward) the suppressing position by the torsion spring 77.

In the present embodiment, the curl suppressing member 75 is a flat plate member formed of ABS (acrylonitrile-butadiene-styrene) or PC/ABS (Polycarbonate/acrylonitrile-butadiene-styrene). The pre-separation plate 22, which is a low sliding plate such as an SUS plate (solid unbleached sulphate plate), is bonded or adhered to a surface of the curl suppressing member 75 which abuts the original documents, as illustrated in FIG. 12A. The retracting position of the curl suppressing member 75 is set so that the pre-separation plates 22 exert a pre-separation effect when the curl suppressing member 75 is moved to the retracting position.

Accordingly, in the present embodiment, the curl suppressing member 75 serves as the pre-separation plate at the retracting position. With the structure of the present embodiment, the curl suppressing member 75—which has both the first function of restricting curling or folding in leading edges of original documents to stabilize the leading edge position during feeding and the second function of pre-separating so as to increase the separating performance—can be obtained with a simple structure. The material and the shape of the curl suppressing member 75 are not limited to those in the present embodiment, but can be any material and shape that would be suitable for these two functions.

Figure 14A:
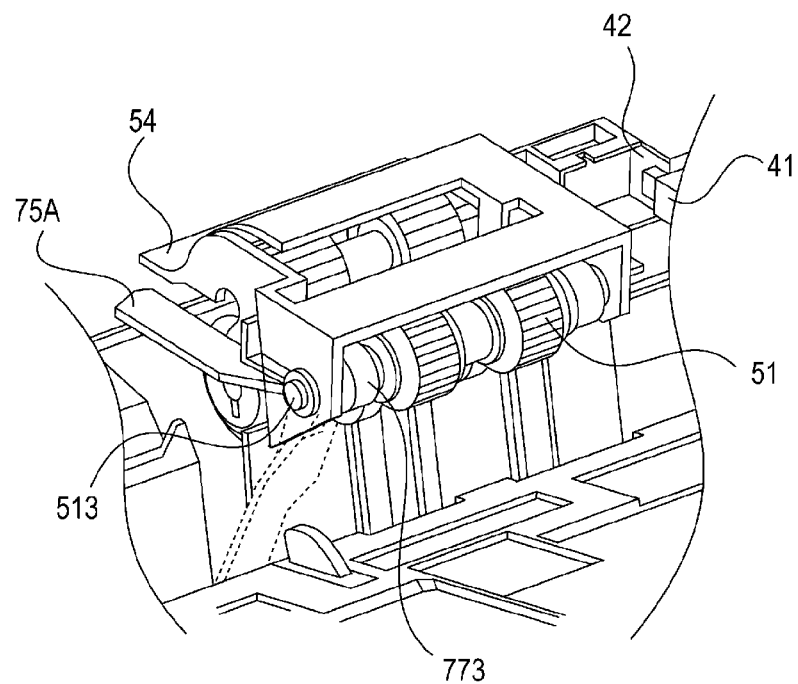
FIGS. 14A and 14B illustrate a structure of a document tray of an automatic document feeder according to a third embodiment of the present invention.
Figure 14B:
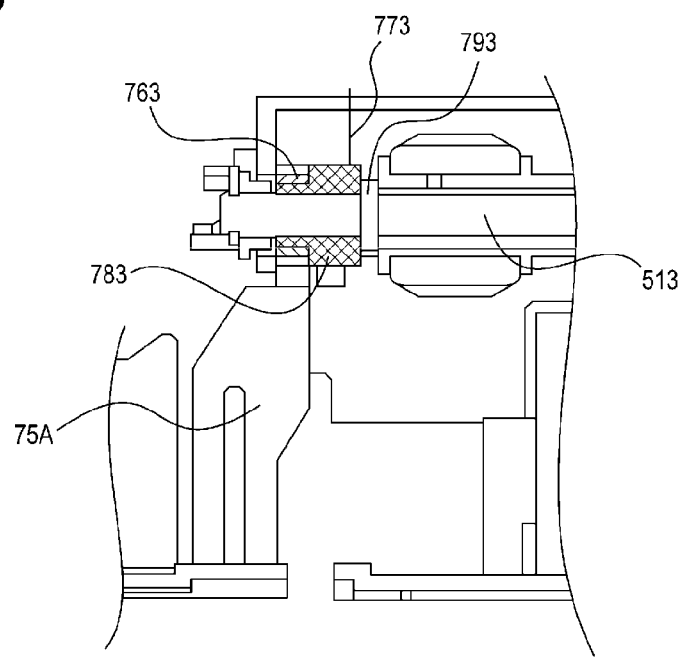

Next, a third embodiment of the present invention will be described. FIGS. 14A and 14B illustrate a portion of an original document tray of an automatic document feeder according to the present embodiment. In FIGS. 14A and 14B, the components which are the same as those in FIGS. 2A, 2B and 7 are represented by the same reference numerals. A curl suppressing member 75A can move between a retracted position illustrated with a solid line and a suppressing position illustrated with a broken line in FIG. 14A. A torque limiter 783 is attached to a drive shaft 513 of the pickup roller 51. The curl suppressing member 75A is also attached to the drive shaft and is provided with a one-way clutch 763 at an inner diameter side of the sleeve or hook that attaches it to the drive shaft. The one-way clutch 763 is attached to the drive shaft coaxially with the torque limiter 783 attached to the drive shaft 513.

In the present embodiment, the curl suppressing member 75A rotates in the same direction as the pickup roller 51 when the pickup roller 51 rotates, and idles when a force in the direction opposite to the rotating direction of the pickup roller 51 is applied thereto, due to the action of the one-way clutch 763. In addition, a torsion spring 773 is attached to the outer housing of the torque limiter 783. The torsion spring 773 is a biasing member which applies a force to the curl suppressing member 75A toward the suppressing position. The inner ring side of the torque limiter 783 drives substantially equally to the drive shaft 513 via a fixing pin 793 press-fitted on the drive shaft 513 of the pickup roller.

The torsion spring 773 applies a maximum torque TSMAX—that is, a torque TSMAX to return to the suppressing position—to the curl suppressing member 75A at the retracted position, and applies a minimum torque TSMIN to the curl suppressing member 75A at the suppressing position. A threshold TL of torque interruption by the torque limiter 783 is set to be larger than the torque TSMAX of the torsion spring at the retracting position and smaller than a torque TU applied by the placing plate 1 via the curl suppressing member 75A while the placing plate is lifted.

Accordingly, the relation of the torques satisfies TSMIN<TSMAX<TL<TU.

Figure 15A:
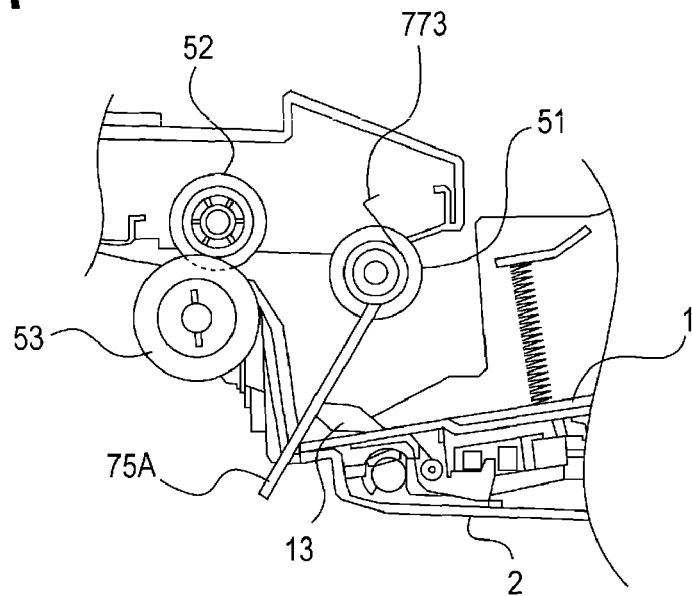
FIGS. 15A to 15C illustrate the movement of the curl suppressing member with lifting and lowering of a placing plate.
Figure 15B:
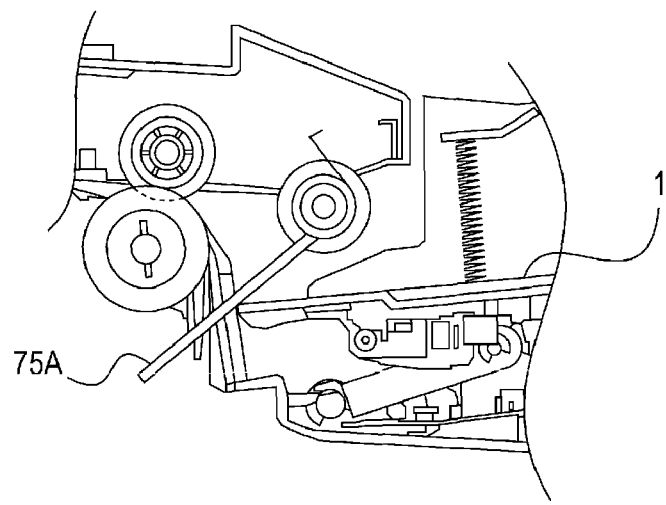
Figure 15C:
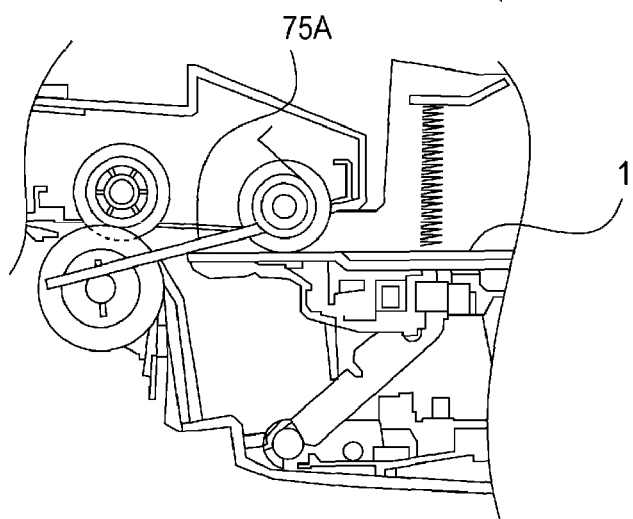

FIGS. 15A to 15C illustrate movement of the curl suppressing member 75A from the suppressing position to the retracted position with the lifting operation of the placing plate 1 in the present embodiment. When the original documents are set as described above, lifting of the placing plate 1 is started and the leading end of an original document in the feeding direction of the placing plate 1 abuts the curl suppressing member 75A at this time. Accordingly, the curl suppressing member 75A is raised in a manner that the angle thereof is increased by the placing plate 1 being lifted as illustrated in FIGS. 15A to 15C in this order to be moved to the retracted position. In the present embodiment, however, even when the placing plate 1 reaches a height at which feeding can be performed, the curl suppressing member 75A is not completely moved to the retracting position but reaches near the retracted position (near the separated position) at this time as illustrated in FIG. 15C.

Figure 16A:
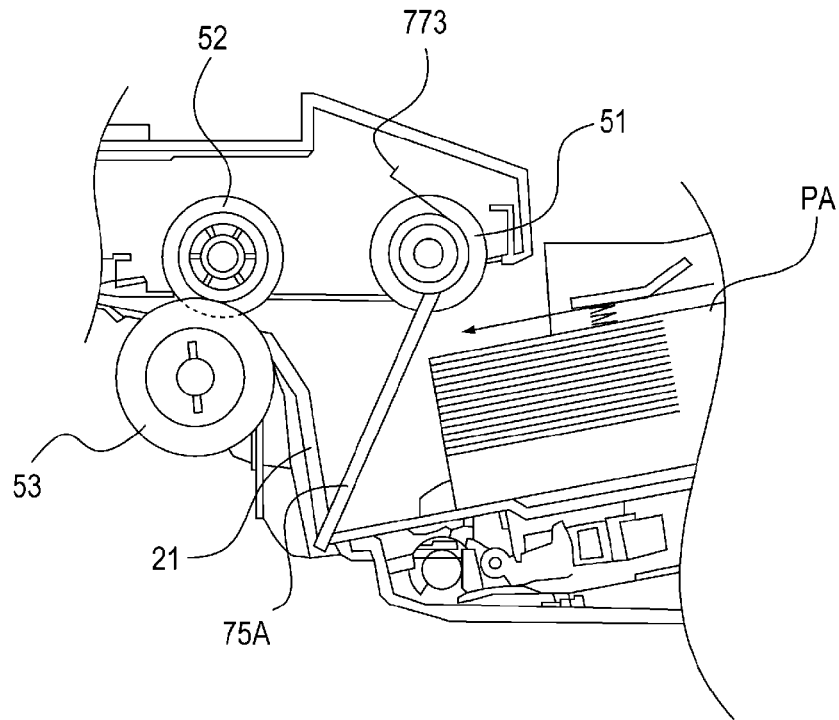
FIGS. 16A and 16B illustrate the movement of the curl suppressing member when a document bundle is stacked.
Figure 16B:
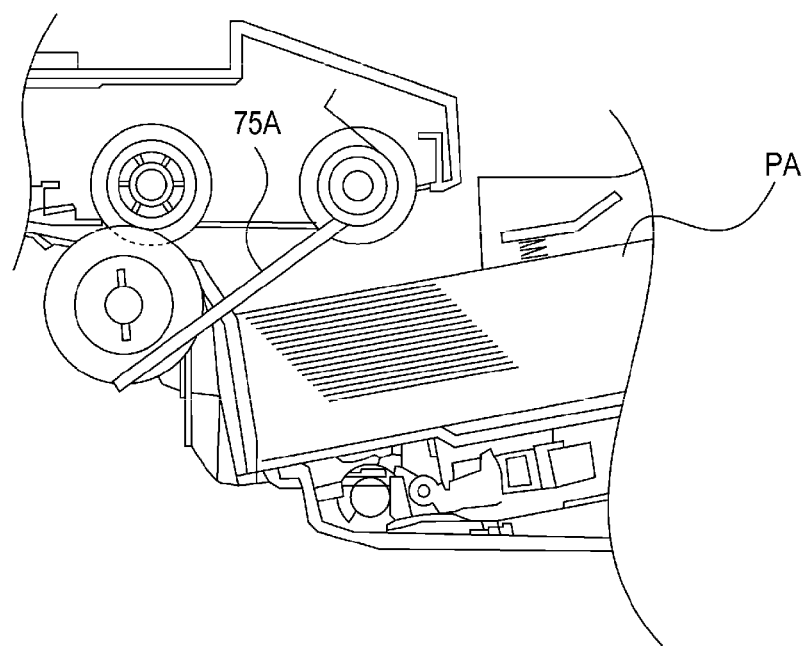

FIGS. 16A and 16B illustrate retraction of the curl suppressing member 75A when an original document bundle PA of a large number of sheets are placed on the placing plate 1 at the set position. As illustrated in FIGS. 16A and 16B, the curl suppressing member 75A moves to the retracting position by being pressed by the leading edge of the original document bundle. In this case, similarly to FIGS. 15A to 15C, the curl suppressing member 75A does not move completely to the retracted position even when the leading edge of the original document bundle PA abuts the abutting portion 21, as illustrated in FIG. 16B. In the present embodiment, the curl suppressing member 75A moves completely to the retracting position when the pickup roller 51 rotates, that is, when the original document feeding operation (sheet feeding operation) is started.

Figure 17A:
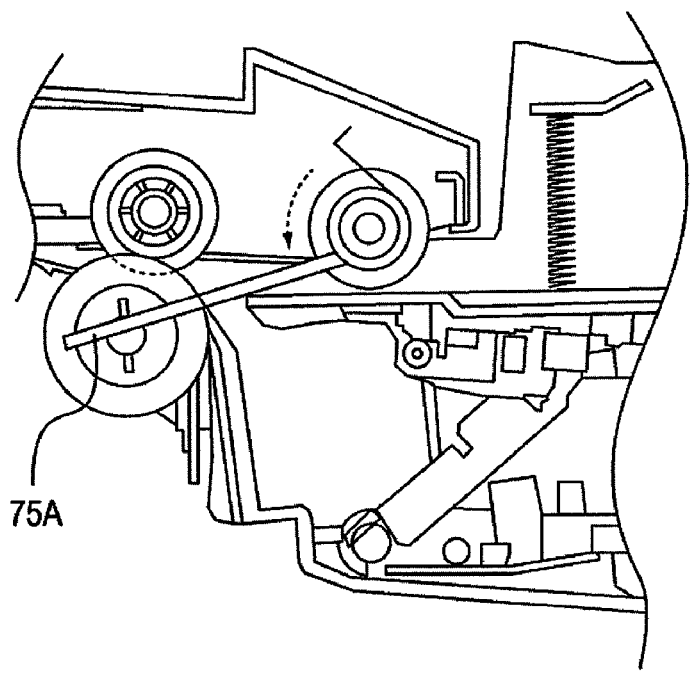
FIGS. 17A and 17B illustrate the movement of the curl suppressing member attached to the placing plate of the original document tray.
Figure 17B:
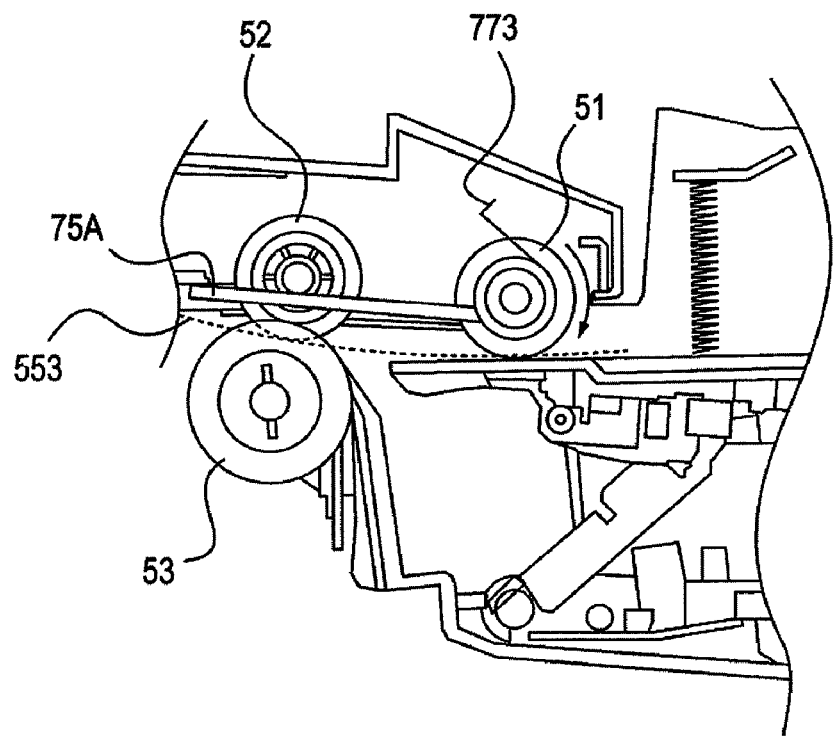

FIG. 17A illustrates a state similar to that of FIG. 15C where the placing plate 1 is moved to the feeding position. The leading edges of the original documents are restricted by the curl suppressing member 75A until the feeding operation is started. When the feeding operation is started from this state and the pickup roller 51 rotates in the direction shown by an arrow in FIG. 17B, the curl suppressing member 75A rotates in the same direction as the pickup roller 51 by the action of the one-way clutch 763. As a result, the curl suppressing member 75A is retracted completely from the original document conveying surface 553 constituted by the pickup roller 51 and the pair of separating rollers 52, 53. At this time, the torsion spring 773 applies the torque TSMAX to return to the suppressing position as shown by a broken-line arrow in FIG. 17A to the curl suppressing member 75A.

However, the torque TL in the direction opposite to that of the broken-line arrow, which is transmitted from the drive shaft 513 of the pickup roller via the torque limiter 783, is set to be larger than the torque TSMAX, as described above. Accordingly, the curl suppressing member 75A is kept in a biased state at the retracted position by the torque TL even when the feeding operation by the pickup roller 51 continues. Subsequently, when the feeding operation ends, the pickup roller 51 stops and torque is not transmitted from the shaft 513 of the pickup roller any longer. Accordingly, the curl suppressing member 75A returns to the position of FIG. 17A due to the torque of the torsion spring 773. Then, the curl suppressing member 75A returns to the suppressing position as illustrated in FIGS. 15C to 15A (in that order) with the lowering operation of the placing plate 1.

As described above, with the curl suppressing member 75A as in the present embodiment, the function of restricting curling or folded leading edges of original documents to stabilize the leading edge position during feeding can be obtained with a simple structure, similarly to the first and second embodiments described above. Further, in the present embodiment, since the leading edges of the original documents can be restricted until immediately before starting of the feeding operation, the leading edge position in feeding can be stabilized more securely. The description presented so far is made on the automatic document feeder 100B which feeds original documents to the image reading units 103 and 150. However, the embodiments can obviously be applied to a sheet feeding apparatus which is arranged in an image forming apparatus and adapted to feed sheets to an image forming unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-205686, filed Sept. 7, 2009, which is hereby incorporated by reference herein in its entirety.

What is claimed is:

1. The sheet feeding apparatus comprising:
   a placing member having a placing surface along which a sheet may be inserted and on which the sheet may be placed;
   a sheet feeding unit configured to feed a top sheet of sheets placed on the placing surface of the placing member in a sheet feeding direction;
   a detection unit which is arranged at a downstream end portion of the placing surface in the sheet feeding direction and is configured to detect a sheet in a state where the sheet is set on the placing member;
   a pressing member which is arranged in an inclined manner so as to be closer to the placing surface at downstream side in the sheet feeding direction than an upstream side and which is adapted to guide a downstream edge in the sheet feeding direction of a sheet toward the placing surface when the sheet is inserted in the sheet feeding direction along the placing surface so that the detection unit can detect the sheet and to press a downstream portion of the sheet, in the state where the sheet is set on the placing member, toward the placing surface,
   wherein the pressing member is movable between a pressing position at which the pressing member presses the downstream portion of the sheet set on the placing member and a retracted position at which the pressing member is retracted from pressing the downstream portion of the sheet on the placing member, the pressing member moved from the pressing position to the retracted position before starting a sheet feeding by the sheet feeding unit; and
   a lifting and lowering unit configured to lift and lower the placing member,
   wherein the lifting and lowering unit is configured to lift the placing member, to a sheet feeding position at which the top sheet is capable of being fed by the sheet feeding unit, and the pressing member is arranged to be directly pressed by the placing member during lifting to the sheet feeding position and moved from the pressing position to the retracted position.

2. The sheet feeding apparatus according to claim 1, further comprising:
   a base plate which supports the placing member in a manner that the placing member is capable of being lifted and lowered by the lifting and lowering unit, the base plate having an abutting portion configured to be abutted by the downstream edge in the sheet feeding direction of a sheet inserted onto the placing surface along the sheet feeding direction,
   wherein the pressing member is pivotably arranged on the base plate below the placing member such that the pressing member is inclined and protrudes upward from the base plate to above the placing member.

3. The sheet feeding apparatus according to claim 1, further comprising:
   a controlling unit configured to control the lifting and lowering unit to lift and lower the placing member based on a detection signal from the detection unit,
   wherein the controlling unit is configured to lift the placing member from a lowermost position after receiving a detection signal indicating that a sheet is placed on the placing surface, and to lower the placing member to the lowermost position upon receiving a signal indicating that no sheet remains on the placing surface.

4. The sheet feeding apparatus according to claim 1,
   wherein the pressing member is configured so that, when a sheet bundle of a predetermined number of sheets or more is placed on the placing surface, the pressing member is pressed by a downstream portion in the sheet feeding direction of the sheet bundle inserted along the placing surface and thus to be moved from the pressing position to the retracted position, and
   when a sheet bundle of less than the predetermined number of sheets is placed on the placing surface, the pressing member is arranged to be pressed by the placing member, which is lifted for sheet feeding, and thus to be moved from the pressing position to the retracted position, and is arranged to be moved from the retracted position to the pressing position with the lowering of the placing member after a sheet has been fed.

5. The sheet feeding apparatus according to claim 2,
   wherein the pressing member has a pressing portion which is configured to press a sheet entering between the pressing member protruding from the base plate above the placing member and the placing surface, and a restricting portion which extends upward from the pressing portion and which is arranged to restrict a sheet with a curl sufficiently large that the sheet cannot be restricted by the pressing portion of the pressing member from entering between the pressing member and the placing member, and
   wherein, when a sheet with the large curl that cannot be restricted by the pressing portion is inserted, the restricting portion is configured to restrict the sheet from entering between the pressing member and the placing member so that the detection unit does not output a detection signal indicating that a sheet is in place on the placing surface.

6. The sheet feeding apparatus according to claim 1,
   wherein the pressing member has an inclined surface constituting a separating portion to separate sheets fed by the sheet feeding unit when the pressing member is moved to the retracted position.

7. The sheet feeding apparatus according to claim 1, further comprising:
a sheet accommodating unit configured to hold at least one sheet prior to the sheet being fed by the sheet feeding apparatus,
wherein the pressing member is arranged to abut a central portion in a width direction perpendicular to the sheet feeding direction of a sheet accommodated in the sheet accommodating unit.

8. An image reading apparatus comprising:
an image reading unit which is configured to read an image on a sheet; and
a sheet feeding apparatus which feeds a sheet to the image reading unit and which comprises:
a placing member having a placing surface along which a sheet may be inserted and on which the sheet may be placed;
a sheet feeding unit configured to feed a top sheet of sheets placed on the placing surface of the placing member in a sheet feeding direction;
a detection unit which is arranged at a downstream end portion of the placing surface in the sheet feeding direction and is configured to detect a sheet;
a pressing member which is arranged in an inclined manner so as to be closer to the placing surface at downstream side in the sheet feeding direction than an upstream side and which is adapted to guide a downstream edge in the sheet feeding direction of the sheet inserted in the sheet feeding direction along the placing surface toward the detection unit and to press a downstream portion in the sheet feeding direction of the sheet toward the placing surface;
wherein the pressing member is movable between a pressing position at which the pressing member presses the downstream portion of the sheet set on the placing member and a retracted position at which the pressing member is retracted from pressing the downstream portion of the sheet on the placing member, the pressing member moved from the pressing position to the retracted position before starting a sheet feeding by the sheet feeding unit; and
a lifting and lowering unit configured to lift and lower the placing member,
wherein the lifting and lowering unit is configured to lift the placing member, to a sheet feeding position at which the top sheet is capable of being fed by the sheet feeding unit, and the pressing member is arranged to be directly pressed by the placing member during lifting to the sheet feeding position and moved from the pressing position to the retracted position.

9. The sheet feeding apparatus according to claim 1, wherein the detection unit comprises a rotation member which rotates by being pushed the sheet inserted along the placing surface and a detection sensor which detects a rotation of the rotation member, and the pressing member is disposed so as to overlap with the rotation member.

10. The sheet feeding apparatus according to claim 1, wherein the pressing member is positioned by abutting with the placing member.

11. The sheet feeding apparatus according to claim 1, wherein the pressing member is disposed at downstream end portion of the placing member in sheet conveying direction.

* * * * *